United States Patent [19]

Kikushima et al.

[11] Patent Number: 4,948,163

[45] Date of Patent: Aug. 14, 1990

[54] DAMPING CHARACTERISTICS VARIABLE HYDRAULIC SHOCK ABSORBER FOR AUTOMOTIVE SUSPENSION SYSTEM WITH VEHICULAR ATTITUDE SUPPRESSING CAPABILITY

[75] Inventors: Shigeru Kikushima; Fumiyuki Yamaoka; Shinobu Kakizaki; Junichi Emura, all of Kanagawa, Japan

[73] Assignee: Atsugi Motor Parts Company, Limited, Kanagawa, Japan

[21] Appl. No.: 359,091

[22] Filed: May 30, 1989

[30] Foreign Application Priority Data

May 31, 1988 [JP] Japan .............................. 63-73101[U]
May 31, 1988 [JP] Japan .............................. 63-73102[U]
Nov. 4, 1988 [JP] Japan ............................ 63-144279[U]

[51] Int. Cl.$^5$ ......................... B62D 6/06; B60G 17/00
[52] U.S. Cl. .................................. 280/707; 280/709; 188/299
[58] Field of Search ............... 280/707, 709; 267/218, 267/64.11, 64.16, 64.19, 64.23, 64.24; 188/299, 322.15

[56] References Cited

U.S. PATENT DOCUMENTS 4,743,000  5/1988  Karnopp .............................. 267/218
4,830,398  5/1989  Williams et al. .................... 280/707

FOREIGN PATENT DOCUMENTS 0221486   5/1987  European Pat. Off. .
0249209  12/1987  European Pat. Off. .
0269132   6/1988  European Pat. Off. .

Primary Examiner—Richard A. Bertsch
Attorney, Agent, or Firm—Bachman & LaPointe

[57] ABSTRACT

A hydraulic shock absorber is provided a capability of quick response in such an extent that harder damping characteristics is provided during bounding stroke in each vibration cycle and softer damping characteristics is provided during rebounding stoke in each vibration cycle. The hydraulic shock absorber is controlled the damping characteristics for damping road shock by switching damping characteristics between harder damping characteristics and softer damping characteristics during normal mode operation. On the other hand, in attitude change suppression mode, suspension characteristics for suppressing vehicular body attitude change irrespective of the vibration mode.

24 Claims, 14 Drawing Sheets

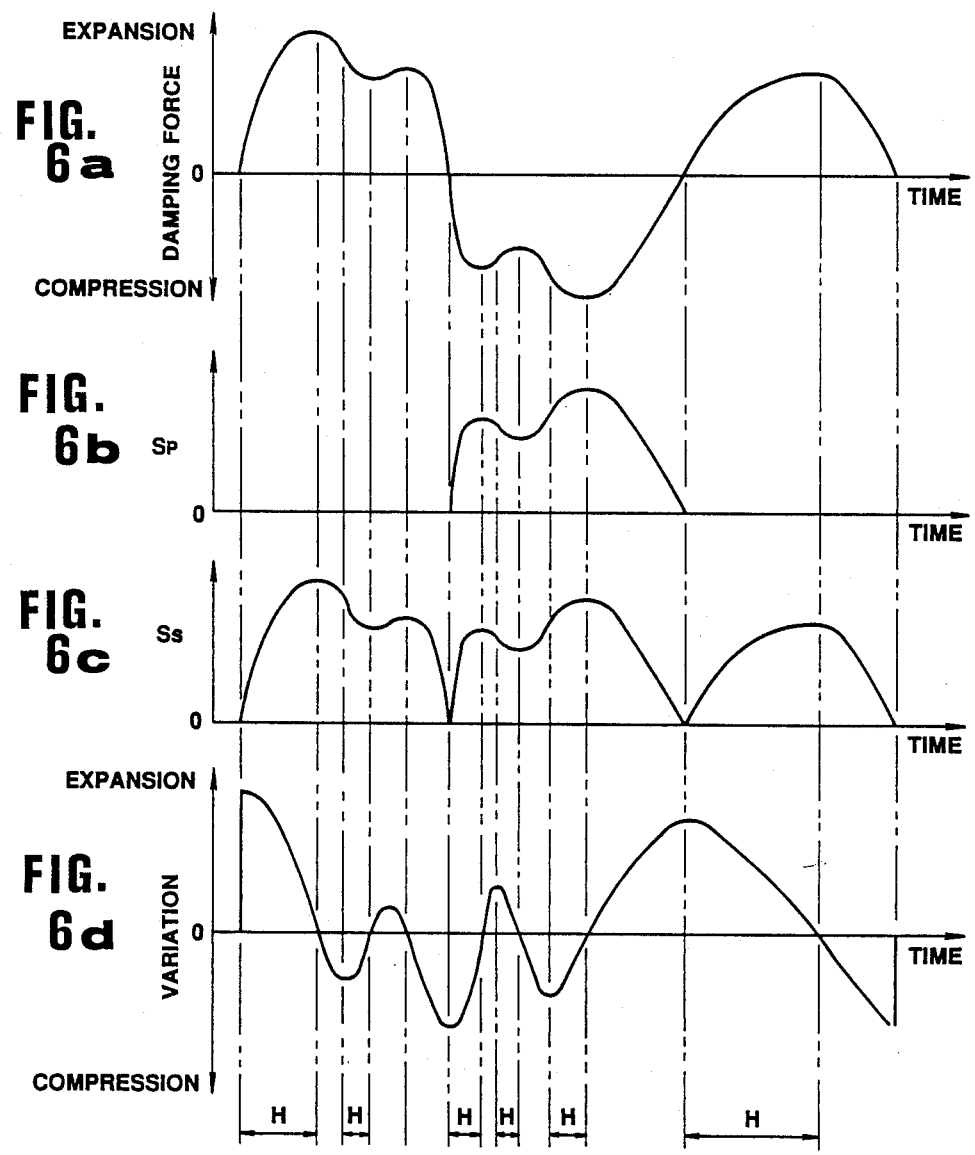

DAMPING CHARACTERISTICS VARIABLE HYDRAULIC SHOCK ABSORBER FOR AUTOMOTIVE SUSPENSION SYSTEM WITH VEHICULAR ATTITUDE SUPPRESSING CAPABILITY

BACKGROUND OF THE INVENTION

1. Field of the Invention

The present invention relates generally to a hydraulic shock absorber for an automotive suspension system. More particularly, the invention relates to a hydraulic shock absorber which is capable of varying damping characteristics during each vibration cycle including bounding and rebounding stroke. The invention further relates to control of suspension characteristics for suppressing vehicular attitude change.

2. Description of the Background Art

One of the typical variable damping force suspension system has been disclosed in Japanese Patent First (unexamined) Publication (Tokkai) Showa No. 61-85210. In the disclosed system, a piezoelectric element is disposed in each shock absorber in each suspension system for detecting variation of fluid pressure in the shock absorber. A control unit is provided for receiving an input indicative of the fluid pressure provided from the piezoelectric element. The control unit outputs a controlled voltage to the piezoelectric element for switching operation mode of the shock absorber at least between SOFT mode in which smaller damping force is to be generated in response to vibration input and HARD mode in which greater damping force is to be generated in response to vibration input. frequency input vibration which induces attitude change of the vehicle body to switch the operational mode of the shock absorber into HARD mode for a given period of time. While the shock absorber is maintained at the HARD mode, the piezoelectric element maintains operation as an actuator for maintaining HARD mode operation of the shock absorber. Therefore, while it is active as the actuator, the piezoelectric element can not monitor fluid pressure.

In the modern technology of suspension control, it has been considered that varying of damping characteristics of shock absorber between a piston compression stroke in response to bounding motion between the vehicle body and a road wheel and a piston expansion stroke in response to rebounding motion between the vehicle body and the road wheel in order to obtain better vibration stabilizing performance. Therefore, it is desirable to adjust the damping characteristics of the shock absorber depending upon the mode of piston action. In order to realize this, it is essential to detect the piston action mode on the basis of variation of the fluid pressure in the shock absorber. However, as set forth above, since the piezoelectric element is held in operative as the fluid pressure sensing element while the shock absorber is maintained at the HARD mode.

This may cause problem in damping shocks. For example, when the damping characteristics in the HARD mode is set to generate relatively great damping force in response to vibration input, damping force generated in response to piston compression mode action can amplify the input vibration. This tendency may be significant for the second and subsequent vibration cycles. This clearly degrades vibration stabilizing performance of the vehicle to provide rough ride feeling.

In addition, in the prior proposed suspension system operates substantially in passive manner to detect the input vibration based on variation of fluid pressure in the shock absorber. Namely, until the vehicle driving condition is changed to require switching of suspension characteristics, the suspension system will never operate to switch suspension characteristics. Therefore, when a criterion of the fluid pressure to switch the suspension mode from SOFT mode to HARD mode is set at relatively high value in order to provide better riding comfort, switch from SOFT mode to HARD mode tends to delay to cause bottoming due to low response characteristics particularly at the initial stage of switching of suspension mode.

On the other hand, in the modern automotive suspension systems, there have been proposed various suspension control systems which can control suspension characteristics for suppressing vehicular body attitude change and whereby achieves high level riding comfort and driving stability. Some of the prior proposed suspension control systems utilize variable damping force shock absorber for adjusting suspension characteristics and whereby suppressing attitude change. The vehicular attitude change is detected by means of a sensor, such as vehicular height sensor, acceleration sensor and so forth in order to perform attitude change suppressive suspension control, such as anti-rolling, anti-pitching control or so forth.

Such prior proposed suspension control system still contains various problems and thus is not satisfactory in achieving satisfactory level of riding comfort and driving stability.

SUMMARY OF THE INVENTION

Therefore, it is an object of the present invention to provide a novel variable damping characteristics shock absorber with quick response ability for enabling achievement of satisfactory riding comfort and driving stability.

Another object of the present invention is to provide an attitude change suppressive suspension control utilizing the variable damping characteristics shock absorber of the invention, which exhibit high response characteristics in attitude control.

In order to accomplish aforementioned and other objects, a hydraulic shock absorber, according to the present invention, is provided a capability of quick response in such an extent that harder damping characteristics is provided during bounding stroke in each vibration cycle and softer damping characteristics is provided during rebounding stoke in each vibration cycle. The hydraulic shock absorber is controlled the damping characteristics for damping road shock by switching damping characteristics between harder damping characteristics and softer damping characteristics during normal mode operation. On the other hand, in attitude change suppression mode, suspension characteristics for suppressing vehicular body attitude change irrespective of the vibration mode.

According to one aspect of the invention, an automotive suspension system comprises:

a shock absorber disposed between a vehicle body and a suspension member rotatably supporting a road wheel, the shock absorber including a cylinder tube connected to one of the vehicle body and the suspension member and defining an internal space, a piston disposed within the internal space for dividing the internal space into first and second chambers and connected to the other of the vehicle body and the suspension member for relative movement with respect to the cylinder tube, the first and second chambers being filled with a working fluid;

a fluid communication means for establishing fluid communication between the first and second chambers with a limited fluid flow rate for generating a damping force against relative motion between the piston and the cylinder tube;

a valve means associated with the fluid communication means for controlling flow restriction of the fluid communication means, the valve means being variable of flow restriction characteristics for varying damping characteristics of the shock absorber;

a first sensor means for monitoring fluid pressure in the first chamber for producing a piston stroke indicative signal indicative of magnitude of piston stroke;

a second sensor means for monitoring a vehicular body attitude change for producing a vehicular attitude change indicative signal having a signal representative of vehicular attitude change;

an actuating means, associated with the valve means and responsive to a control signal, for controlling the valve means for adjusting flow restriction characteristics according the the control signal; and a controlling means, receiving the piston stroke indicative signal, for controlling the actuating means for controlling damping characteristics depending upon the vehicle driving condition, the controlling means operating in a first operational mode while the vehicular attitude change indicative signal value is smaller than a predetermined attitude change criterion and a second mode while the attitude change indicative signal value is greater than or equal to the attitude change criterion, the controlling means, operating in the first operational mode, outputting the control signal alternating damping characteristics at least between a first harder damping characteristics and a second softer damping characteristics in depending upon piston stroke direction in each vibration cycle, and operating in the second operational mode, outputting control signal for suppressing attitude change irrespective of piston stroke direction.

According to another aspect of the invention, an automotive suspension system comprises:

a first shock absorber disposed between a vehicle body and a first suspension member rotatably supporting a road wheel, the first shock absorber including a cylinder tube connected to one of the vehicle body and the first suspension member and defining an internal space, a piston disposed within the internal space for dividing the internal space into first and second chambers and connected to the other of the vehicle body and the first suspension member for relative movement with respect to the cylinder tube, the first and second chambers being filled with a working fluid;

a second shock absorber disposed between a vehicle body and a second suspension member rotatably supporting a road wheel and oriented at different position to the first suspension member, the second shock absorber including a cylinder tube connected to one of the vehicle body and the second suspension member and defining an internal space, a piston disposed within the internal space for dividing the internal space into first and second chambers and connected to the other of the vehicle body and the second suspension member for relative movement with respect to the cylinder tube, the first and second chambers being filled with a working fluid;

a fluid communication means for establishing fluid communication between the first and second chambers with a limited fluid flow rate for generating a damping force against relative motion between the piston and the cylinder tubes of
the first and second shock absorbers;

first and second valve means respectively associated with the fluid communication means for controlling flow restriction of the fluid communication means, the valve means being variable of flow restriction characteristics for varying damping characteristics of the first and shock absorbers independently of each other;

a first piston stroke sensor means for monitoring fluid pressure in the first chamber of the first shock absorber for producing a first piston stroke indicative signal indicative of magnitude of piston stroke;

a second piston stroke sensor means for monitoring fluid pressure in the first chamber of the second shock absorber for producing a second piston stroke indicative signal indicative of magnitude of piston stroke;

a vehicular attitude sensor means for monitoring a vehicular body attitude change for producing a vehicular attitude change indicative signal having a signal representative of vehicular attitude change;

first and second actuating means, respectively associated with the first and second valve means and responsive to first and second control signal, for controlling associated first and second valve means for adjusting flow restriction characteristics according the first and second control signal; and a controlling means, receiving the first and second piston stroke indicative signals, for controlling the actuating means for controlling damping characteristics of the first and second shock absorbers depending upon the vehicle driving condition, the controlling means operating in a first operational mode while the vehicular attitude change indicative signal value is smaller than a predetermined attitude change criterion and a second mode while the attitude change indicative signal value is greater than or equal to the attitude change criterion, the controlling means, operating in the first operational mode, outputting the control signal alternating damping characteristics of the first and second shock absorbers at least between a first harder damping characteristics and a second softer damping characteristics in depending upon piston stroke direction in each vibration cycle, and operating in the second operational mode, outputting the first and second control signal for suppressing attitude change irrespective of piston stroke direction.

The controlling means may operate for controlling damping characteristics of each of the first and second shock absorber in the first operational mode by deriving a piston motion representative data on the basis of the piston stroke indicative signal, comparing the piston motion representative data with a predetermined deadband criteria which are set with respect to a neutral value and defining a predetermined deadband, and detecting the piston motion representative data out of the deadband and reaching a peak value for producing the control signal for harder damping characteristics and detecting the piston motion representative data varying across the neutral value for producing the control signal for softer damping characteristics. The controlling means may operate in the second operational mode for outputting the first and second control signal for hardening damping characteristic of the first and second shock absorbers, the controlling means selectively providing harder damping characteristics for respective of the first and second shock absorbers in piston stroke direction. Also, the controlling means, operating in the second operational mode, may be responsive to piston stroke in bounding direction to output the control signal ordering harder damping characteristics against piston bounding stroke. Preferably, the controlling means, operating in the second operational mode, may also be responsive to piston stroke in rebounding direction to output the control signal ordering harder damping characteristics against piston rebounding stroke.

The vehicular attitude sensor monitors a vehicle driving parameter which is associated with vehicular attitude, the controlling means detects vehicle driving condition having possibility of causing vehicular attitude change on the basis of the vehicular attitude change indicative signal and detects actual occurrence of vehicular attitude change based on the piston stroke indicative signal under the presence of the vehicular attitude change indicative signal representing the vehicle driving condition having possibility of causing vehicle attitude change.

According to a further aspect of the invention, an anti-rolling suspension system comprises:

a first shock absorber disposed between a vehicle body and a first suspension member rotatably supporting a road wheel, the first shock absorber including a cylinder tube connected to one of the vehicle body and the first suspension member and defining an internal space, a piston disposed within the internal space for dividing the internal space into first and second chambers and connected to the other of the vehicle body and the first suspension member for relative movement with respect to the cylinder tube, the first and second chambers being filled with a working fluid;

a second shock absorber disposed between a vehicle body and a second suspension member rotatably supporting a road wheel and oriented at lateral opposite side of vehicle body relative to the first suspension member, the second shock absorber including a cylinder tube connected to one of the vehicle body and the second suspension member and defining an internal space, a piston disposed within the internal space for dividing the internal space into first and second chambers and connected to the other of the vehicle body and the second suspension member for relative movement with respect to the cylinder tube, the first and second chambers being filled with a working fluid;

first and second fluid communication means, disposed within respective of the first and second shock absorbers, for establishing fluid communication between the first and second chambers of respective first and second shock absorbers with a limited fluid flow rate for generating damping force against relative motion between the piston and the cylinder tubes of the first and second shock absorbers;

first and second means respectively associated with the fluid communication means of the first and second shock absorber for controlling flow restriction of the fluid communication means, the valve means being variable of flow restriction characteristics for varying damping characteristics of the first and shock absorbers independently of each other, the first and second means being responsive to fluid pressure in the first chamber and second chambers of respectively associated the first and second shock absorbers for producing a first and second piston stroke indicative signals, each indicative of magnitude of piston stroke;

a vehicular attitude sensor means for monitoring a vehicular body attitude change for producing a vehicular attitude change indicative signal having a signal representative of vehicular attitude change;

a controlling means, receiving the first and second piston stroke indicative signals and the attitude change indicative signal, for controlling the first and second means in order to control damping characteristics of the first and second shock absorbers depending upon the vehicle driving condition, the controlling means being responsive to the vehicular rolling for outputting the first and second control signal for increasing flow restriction of the one of the first and second means in order to harden damping characteristics against piston bounding stroke for one of the first and second shock absorbers acting in bounding stroke, and for increasing flow restriction of the other one of the first and second means in order to harden damping characteristics against piston rebounding stroke for the other of the first and second shock absorbers acting in rebounding stroke. According to a still further aspect of the invention, an anti-pitching suspension system comprises:

a first shock absorber disposed between a vehicle body and a first suspension member rotatably supporting a road wheel, the first shock absorber including a cylinder tube connected to one of the vehicle body and the first suspension member and defining an internal space, a piston disposed within the internal space for dividing the internal space into first and second chambers and connected to the other of the vehicle body and the first suspension member for relative movement with respect to the cylinder tube, the first and second chambers being filled with a working fluid;

a second shock absorber disposed between a vehicle body and a second suspension member rotatably supporting a road wheel and oriented at longitudinal opposite side of vehicle body relative to the first suspension member, the second shock absorber including a cylinder tube connected to one of the vehicle body and the second suspension member and defining an internal space, a piston disposed within the internal space for dividing the internal space into first and second chambers and connected to the other of the vehicle body and the second suspension member for relative movement with respect to the cylinder tube, the first and second chambers being filled with a working fluid;

first and second fluid communication means, disposed within respective of the first and second shock absorbers, for establishing fluid communication between the first and second chambers of respective first and second shock absorbers with a limited fluid flow rate for generating damping force against relative motion between the piston and the cylinder tubes of the first and second shock absorbers;

first and second means respectively associated with the fluid communication means of the first and second shock absorber for controlling flow restriction of the fluid communication means, the valve means being variable of flow restriction characteristics for varying damping characteristics of the first and shock absorbers independently of each other, the first and second means being responsive to fluid pressure in the first chamber and second chambers of respectively associated the first and second shock absorbers for producing a first and second piston stroke indicative signals, each indicative of magnitude of piston stroke;

a vehicular attitude sensor means for monitoring a vehicular body attitude change for producing a vehicular attitude change indicative signal having a signal representative of vehicular attitude change;

a controlling means, receiving the first and second piston stroke indicative signals and the attitude change indicative signal, for controlling the first and second means in order to control damping characteristics of the first and second shock absorbers depending upon the vehicle driving condition, the controlling means being responsive to the vehicular pitching for outputting the first and second control signal for increasing flow restriction of the one of the first and second means in order to harden damping characteristics against piston bounding stroke for one of the first and second shock absorbers acting in bounding stroke, and for increasing flow restriction of the other one of the first and second means in order to harden damping characteristics against piston rebounding stroke for the other of the first and second shock absorbers acting in rebounding stroke.

Preferably, the controlling means operates for controlling damping characteristics of each of the first and second shock absorber deriving a piston motion representative data on the basis of the piston stroke indicative signal, comparing the piston motion representative data with a predetermined deadband criteria which are set with respect to a neutral value and defining a predetermined deadband, and detecting the piston motion representative data out of the deadband and reaching a peak value for producing the control signal for harder damping characteristics and detecting the piston motion representative data varying across the neutral value for producing the control signal for softer damping characteristics, which the attitude change indicative signal representing vehicular driving condition to cause vehicular pitching is absent. The vehicular attitude sensor monitors a vehicle driving parameter which is associated with vehicular attitude, the controlling means detects vehicle driving condition having possibility of causing vehicular attitude change on the basis of the vehicular attitude change indicative signal and detects actual occurrence of vehicular attitude change based on the piston stroke indicative signal under the presence of the vehicular attitude change indicative signal representing the vehicle driving condition having possibility of causing vehicle attitude change.

According to a yet further aspect of the invention, a shock absorber comprises:

a cylinder tube disposed between a vehicle body and a suspension member rotatably supporting a road wheel;

a piston disposed within an internal space of the cylinder tube for dividing the internal space into first and second chambers, the first and second chambers being filled with a working fluid;

a fluid communication means, disposed within respective of the shock absorber, for establishing fluid communication between the first and second chambers with a limited fluid flow rate for generating damping force against relative motion between the piston and the cylinder tube;

means, associated with the fluid communication means for controlling flow restriction of the fluid communication means, the flow restriction controlling means being variable of flow restriction characteristics for varying damping characteristics of the shock absorber, the flow restriction controlling means being responsive to fluid pressure in the first chamber and second chambers for producing a piston stroke indicative signal, each indicative of piston stroke activity, the flow restriction controlling means being responsive to road shock for alternating flow restriction between first greater value and second smaller value during each of vibration cycle, and being responsive to vehicular attitude change to set the first greater value of flow restriction at least in piston bounding stroke so as to harden damping characteristics against piston bounding stroke motion.

The flow restriction controlling means is responsive to rebounding direction of piston stroke in vehicular attitude change for setting the flow restriction at the first value in the piston rebounding direction in order to harden damping characteristics against piston rebounding stroke motion.

BRIEF DESCRIPTION OF THE DRAWINGS

The present invention will be understood more fully from the detailed description of the invention given herebelow and from the accompanying drawings of the present invention, which, however, should not be taken to limit the invention to the specific embodiment, but are for explanation and understanding only.

In the drawings:

FIGS. 6a, 6b, 6c and 6d are timing charts showing variations of suspension mode in relation to variation of damping force to be generated in the shock absorber;

DESCRIPTION OF THE PREFERRED EMBODIMENT

Figure 1:
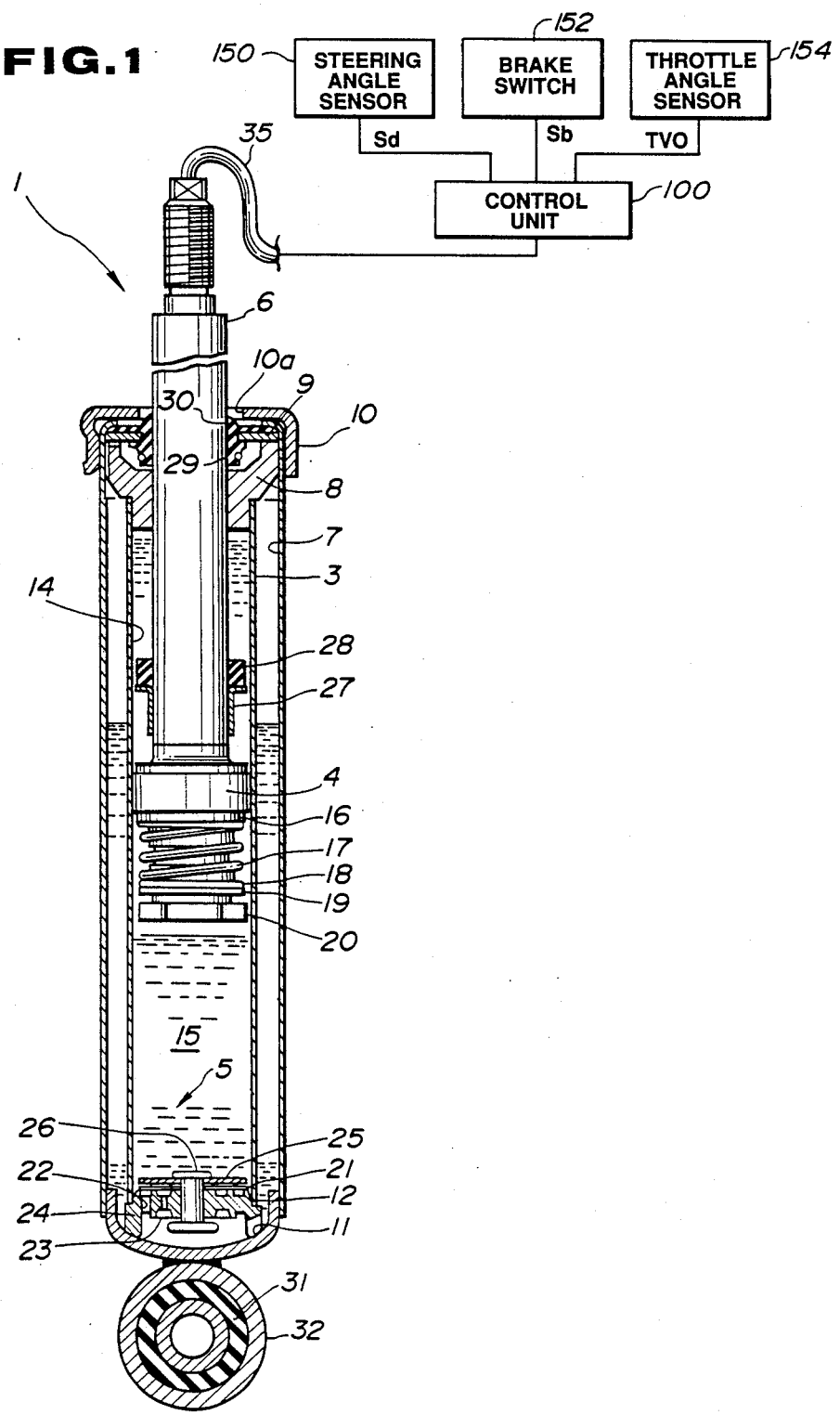
FIG. 1 is a section of preferred embodiment of a variable damping force shock absorber according to the present invention, which is associated with a control unit implementing a preferred process of suspension control.

Referring now to the drawings, particularly to FIG. 1, the preferred embodiment of a shock absorber, according to the present invention, serves as a principle component of the preferred embodiment of an automotive suspension system, according to the invention. The shown shock absorber 1 comprises a double action type shock absorber variable of damping characteristics. The shock absorber 1 has inner and outer cylinder tubes 3 and 2. The inner and outer cylinders 3 and 2 are arranged in coaxial arrangement for defining an annular chamber 7 which serves as a reservoir chamber.

A piston assembly 4 is disposed within the internal space of the inner cylinder tube 3 for dividing the internal space into upper and lower working chambers 14 and 15. The piston assembly 4 is supported on the lower end of a piston rod 6. The piston rod 6 is a guided by a rod guide 8 is engaged in the top end opening of the inner cylinder tube 3. The rod guide 8 cooperates with a piston seal 9 and a stopper plate 10 to form an upper plug assembly for sealingly closing the top ends of the inner and outer cylinder tubes 3 and 2.

The top end of the piston rod 6 is connected to a vehicle body (not shown) in per se known manner. On the other hand, a connecting eye 32 with an eye bushing 31 is provided on the lower end of the outer cylinder tube 2. The outer cylinder tube 2 is connected to a suspension member (not shown) rotatably supporting a road wheel. By this, the shock absorber 1 is disposed between the vehicle body and the suspension member to receive vibration energy causing relative displacement between the vehicle body and the suspension member. The shock absorber 1 is compressed in response to bounding stroke motion, in which the vehicle body and the suspension member are shifted to approach to each other, and expanded in response to a rebounding stroke motion, in which the vehicle body and suspension member are shifted away to each other. In response to the bounding stroke motion of the vehicle body and the suspension member, the piston assembly 4 strokes in compression stroke direction with compressing the lower working chamber 15. This causes increasing of working fluid pressure in the lower working chamber and decreasing of the working fluid pressure in the higher working chamber. On the other hand, in response to the rebounding stroke motion of the vehicle body and the suspension member, the piston assembly 4 strokes in expansion stroke direction with compressing the higher working chamber 14. Therefore, the fluid pressure in the upper working chamber 14 is increased and the fluid pressure in the lower working chamber 15 is decreased. The fluid reservoir chamber 7 is normally maintained at a pressure substantially corresponding to fluid pressure in the lower working chamber 15 stroke motion, The lower end opening of the inner cylinder 3 is closed by a bottom valve assembly 12 which defines a communication path 11. The bottom valve assembly 12 thus establishes fluid communication between the fluid reservoir chamber 7 and the lower working chamber 15.

The piston assembly 4 accompanies an expansion valve 16 which is effective in a piston expansion stroke to produce a damping force. The expansion valve 16 is associated with a bias spring 17 which is active on the expansion valve 16 to constantly bias the latter in upward direction. The bias spring is mounted on the lower end of the piston rod 6 by means of an adjuster nut 18 and a lock nut 19. An adjuster nut 20 also engages with the lower end of the piston rod 6.

The bottom valve assembly 5 has a check valve 21 associated with a port 22 for openably closing the port. The check valve 21 is designed to open during piston expansion stroke to permit fluid flow from the reservoir chamber 7 to the lower working chamber 15. The bottom valve 5 is also provided with a compression valve 23 which is associated with the lower end of an orifice 24 to open in response to compression stroke in order to establish fluid communication from the lower working chamber 15 to the reservoir chamber 7. The check valve 21 and the compression valve 23 are mounted and secured on a bottom valve body 12 by means of a clamping pin 26. A stopper plate 25 is also mounted on the bottom valve body 12 in order to restrict magnitude of opening of the check valve 21. With the shown construction, the check valve 21 is responsive to the pressure difference between the lower working chamber 15 and the fluid reservoir chamber 7 to be shifted to the open position for introducing the working fluid in the fluid reservoir chamber into the lower working chamber. On the other hand, during piston compression stroke, pressure difference between the lower working chamber 15 and the fluid reservoir chamber 7 is created to shift the compression valve 23. By opening of the compression valve 23, a limited flow rate of the working fluid is permitted to flow from the lower working chamber 15 to the fluid reservoir chamber 7 with generating a damping force.

A rebounding stopper 28 which is made of an elastic material, such as a rubber, is mounted on the piston rod 6 by means of a retainer 27. The rebounding stopper 28 protects the piston assembly 4 from direct collision onto the lower end of the rod guide 8.

The stopper plate 10 is clamped onto the upper end of the outer cylinder tube 2. The stopper 10 defines a center opening 10a, through which the piston rod 6 extends. A rubber bushing (not shown) engages with the periphery of the center opening 10a of the stopper plate 10 for slidingly and sealingly guide the piston rod 6. A main lip 29 and a dust lip 30 are also provided in the upper plug assembly. The main lip 29 sealingly contact with the outer periphery of the piston rod for establishing a fluid tight seal. On the other hand, the dust lip 30 is provided in the vicinity of the stopper plate and contacts with the outer periphery of the piston rod 4 to establish fluid tight seal so as to prevent the muddy water, dust and so forth.

The piston assembly 4 is designed to vary damping characteristics to generate damping force in response to vibration input according to variable characteristics in different damping mode. In order to control the damping mode of the piston assembly 4, a control unit 100 is connected to the piston assembly via a harness 35 which extends through the piston rod.

Figure 2:
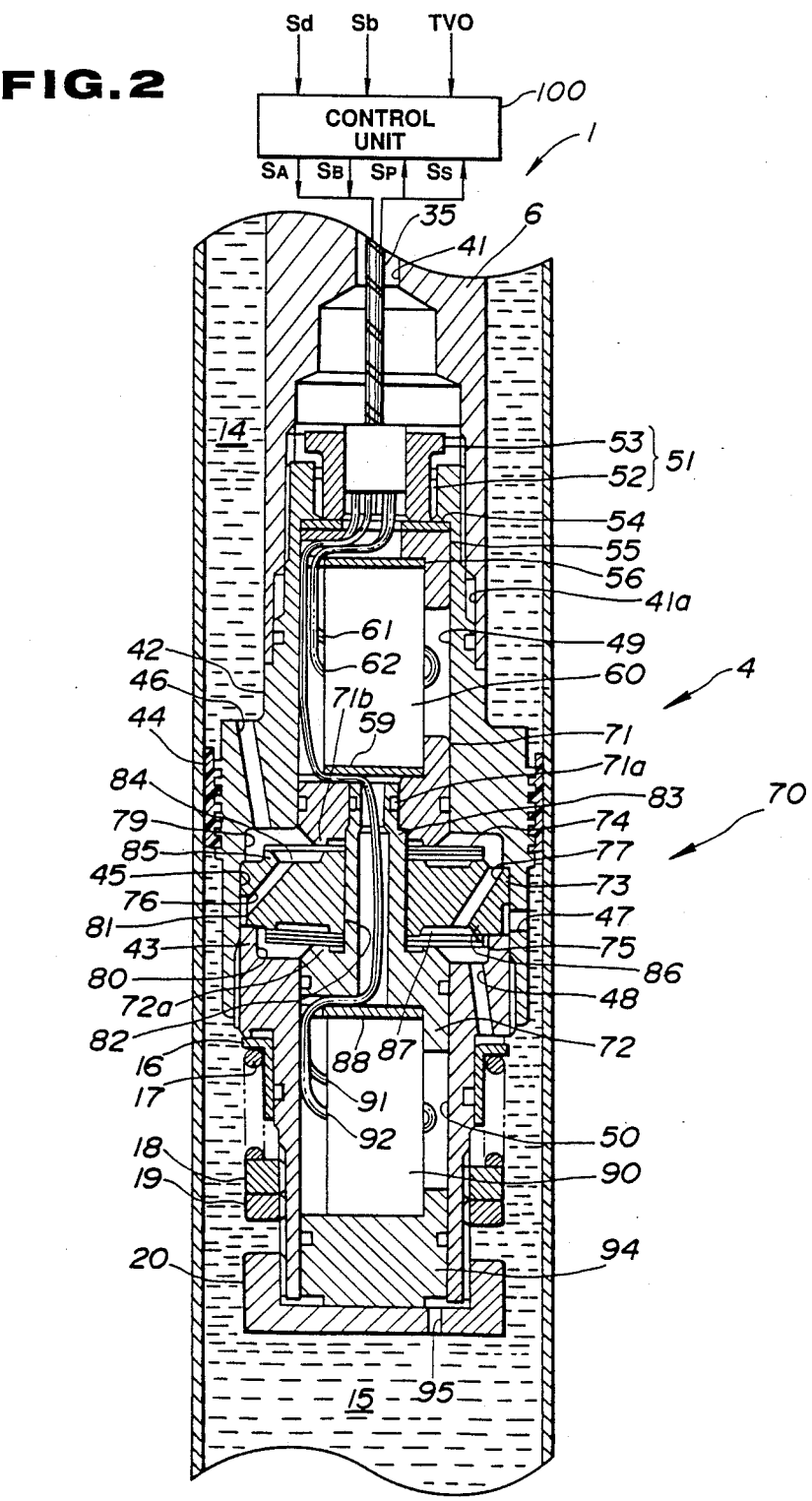
FIG. 2 is an enlarged section of the major part of the preferred embodiment of the variable damping force shock absorber, according to the invention.

FIG. 2 shows the detailed construction of the piston assembly 4 employed in the preferred embodiment of the shock absorber 1 of FIG. 1. As seen, the piston rod 6 defined an axially extending through opening 41 through which the wiring harness 35 extends. The lower end of the through opening 41 is communicated with a threaded groove 41a forming a piston receptacle.

The piston assembly 4 includes a piston body 42 which has an upward extension which threadingly engages with the threaded groove 41a of the piston rod 6 so that the piston body 42 is firmly mounted on the lower end of the piston rod 6. The piston body 42 has an outer periphery mating with the inner periphery of the inner cylinder 3. A low friction seal member 44 which is made of a low friction material, such as a teflon, engages on the outer periphery of the piston body 42 for establishing the fluid tight seal between the inner periphery of the inner cylinder 3. The piston body 42 has a threaded lower end, to which the upper end of a sleeve 43 engages. The aforementioned adjusting nut 18, the lock nut 19 and the adjusting nut 20 are engaged onto the outer periphery of the lower end portion of the sleeve 43.

The piston body 42 defines an internal space 45 which is in communication with the upper and lower working chambers via communication path 46 and 47 defined therethrough. On the other hand, the sleeve 43 defines a through opening 48 for communication between the internal space 45 and the lower working chamber 15. The expansion valve 16 is associated with the end of the through opening 48 opening to the lower working chamber 15 so as to restrict fluid flow path area for generating damping force. The expansion valve 16 is responsive to a fluid pressure overcoming the spring force of the bias spring 17 to widen the path area for pressure relieving function.

The assembly of the piston body 42 and the sleeve 43 defines first and second chambers 49 and 50 of essentially circular cross section. These first and second chambers 49 and 50 have smaller diameter than the space 45 and communicated with the later. A first piezoelectric element 60 is disposed within the first chamber 49. The first piezoelectric element 60 has an upper section associated with an adjusting mechanism 51. The adjusting mechanism 51 comprises an adjuster screw 53 engaging with a female thread 52 formed on the inner periphery of the top end of the piston body 42. The adjuster nut 53 has a lower end coupled with an upper end plate 56 fixed onto the upper end of the piezoelectric element 60 via a contact plate 54 and a cap 55. The adjuster screw 53 is manually rotatable for axial shifting to cause axial displacement of the piezoelectric element 60. The piezoelectric element 60 is associated with a slider member 71 via a lower end plate 59.

Similarly, a second piezoelectric element 90 is disposed within the second chamber 50. The second piezoelectric element 90 is supported within the second chamber by means of a cap 94 and the adjuster nut 20, so that the axial position thereof can be adjusted by means of the adjusting nut. The upper end of the second piezoelectric element 90 is associated with a valve core 72 via an upper end plate 88.

The slider 71 and the valve bore 72 are associated with a valve body 73 to form a damping mode control mechanism 70. As seen, the valve body 73 is disposed within the space 45 to define therein upper and lower annular chambers 79 and 80. The valve body 73 further defines an annular chamber 81 defined between the outer periphery of the valve body 73 and the inner periphery of the piston body 42. The upper annular chamber 79 is in communication with the upper working chamber 14 via a communication path 48. On the other hand, the lower annular chamber 80 is in communication with the flow working chamber 15 via the through opening 48. The annular chamber 81 is in communication with the lower working chamber 15 with the fluid path 47. The valve body 73 defines a center opening 82 through which an upper cylindrical section 83 of the valve core 72 extends, and communication orifices 76 and 77. The communication orifice 76 opens to an annular groove 84 formed on the upper surface of the valve body and surrounded by an annular land 85. The annular groove 84 is exposed to the upper annular chamber 79. The communication orifice 76 also opens to the annular chamber 81. On the other hand, the communication orifice 77 opens to an annular groove 87 formed on the lower surface of the valve body 72 and surrounded by an annular land 86. The annular groove 86 is exposed to the lower annular chamber 80. The communication orifice 77 also opens to the upper annular chamber 79.

Upper and lower valve members 74 and 75 are provided for openably closing the annular grooves 84 and 87 and whereby blocking fluid communication between the annular grooves and the associated annular chambers 79 and 80. The valve members 74 and 75 comprises leaf springs resiliently deformable in response to the pressure exerted thereto. Normally, the valve members 74 and 75 are supported at the center boss sections projecting at the center portion of valve body. At this position, the lever length of the valve members 74 and 75 is relatively large to have an initial stiffness to cause resilient deformation in response to the fluid pressure exerted thereto. On the other hand, when the annular projections 71b and 72a of the slider 71 and the valve core 72 are active on the valve member 74 and 75 when the slider and valve cores are operated by the effect of the piezoelectric elements 60 and 90, the lever lengths of the valve members are reduced to increase stiffness for generating greater damping force in response to vibration input. In the following discussion, the damping mode where the valve member 74 and 75 operates in smaller stiffness, in which the annular projections 71b and 72 of the slider and valve core are not active, will be referred to as SOFT mode. On the other hand, the damping mode where the annular projections are active to increase stiffness, will be hereafter referred to as HARD mode.

It should be noted that the valve members 74 and 75 can comprise a plurality of thin disc shaped relief springs for resilient deformation in response to the fluid pressure exerted thereonto.

As seen from FIG. 2, the first and second piezoelectric elements 60 and 90 are connected to the control unit 100 via cables 61, 62, 91 and 92 which forms the wiring harness. As can be clearly seen from FIG. 4, the cables 61 and 91 connect respectively associated piezoelectric elements 60 and 90 to the ground. On the other hand, the cables 62 and 92 connect the piezoelectric elements 60 and 90. Each of the piezoelectric elements 60 and 90 comprises a plurality of thin disc shaped piezoelectric plates piled up in series. Each of the piezoelectric plates respectively having a pair of electrodes. As is well known, when a voltage is applied to such piezoelectric plates to cause electrodistortion to expand and contact the axial length. The magnitude of electrodistortion is variable depending upon the magnitude of voltage applied to the piezoelectric plates. Such electrodistortion may cause mechanical distortion of the piezoelectric element to cause variation of the axial length.

On the other hand, when the fluid pressure is applied to the piezoelectric elements 60 and 90, each of the piezoelectric plate as the components of the piezoelectric elements is caused mechanical distortion for producing an electric power. The magnitude of the electric power to be generated by the piezoelectric elements 60 and 90 is variable depending upon the magnitude of the mechanical distortion and whereby corresponding to the magnitude of the pressure exerted on the piezoelectric elements. In the practical construction, the first piezoelectric element 60 is subject a fluid pressure of the annular chamber 81 exerted on the valve member 74 which corresponds to the fluid pressure in the lower working chamber 5, via the slider. The first piezoelectric element 60 is thus produces a compression mode pressure indicative signal Sp. On the other hand, the second piezoelectric element 90 is subject fluid pressure in the upper annular chamber 79 exerted on the valve member via the valve member 75 and the valve core 72, which fluid pressure corresponds to that in the upper fluid chamber 14. The second piezoelectric element 90 thus produces a expansion mode pressure indicative signal Ss. As will be appreciated, the magnitude of the compression mode pressure indicative signal Sp and the expansion mode pressure indicative signal Ss are variable depending upon the magnitude of pressure in the upper and lower working chambers 14 and 15. In addition, in the piston compression stroke, the fluid pressure in the lower working chamber 15 is also exerted on the second piezoelectric element 90 via the adjuster nut 20 and a cap 94. Therefore, even in the piston expansion stroke, the second piezoelectric element 90 outputs the expansion mode pressure indicative signal Ss. Therefore, in the piston expansion stroke, only expansion mode pressure indicative signal Ss is output from the piezoelectric element 90. On the other hand, in the piston compression stroke, both of the compression mode and expansion mode pressure indicative signals Sp and Ss are output from the first and second piezoelectric elements 60 and 90.

The piezoelectric elements 60 and 90 feeds the compression mode pressure indicative signal Sp and the expansion mode pressure indicative signal Ss to the control unit 100. The control unit 100 processes these compression mode and expansion mode pressure indicative signals Sp and Ss to produce an expansion mode control signal $S_A$ and a compression mode control signal $S_B$. The expansion mode control signal $S_A$ is fed to the first piezoelectric element 60 for controlling axial length thereof to adjust the position of the valve core 72 and whereby adjust the stiffness of the valve members 74 and 75. By adjusting the stiffness of the valve member 75, the damping characteristics in response to the piston expansion stroke can be switched between HARD mode and SOFT mode. Similarly, the compression mode control signal $S_B$ is applied to the second piezoelectric element 90 for controlling the axial length thereof to adjust the position of the slider 71 relative to the valve members 74 and 75 and whereby adjusts the stiffness of the associated valve member in order to switch the damping mode between HARD mode and SOFT mode. By this, the damping characteristics in the piston compression stroke can be adjusted.

FIGS. 1 through 4, the control unit 100, in the preferred embodiment of the suspension system according to the invention, performs anti-rolling and anti-pitching suspension control for regulating vehicular attitude change. In order to enable anti-rolling and anti-pitching suspension control, the suspension system is connected to a steering angle sensor 150, a brake switch 152 and a throttle angle sensor 154. The steering angle sensor 150 is associated with a vehicular steering mechanism and monitors angular displacement of the steering to produce a steering angle signal Sd which represents magnitude and direction of steering angular displacement. The brake switch 152 is turned between ON and OFF depending upon a vehicular brake position. Namely, the brake switch 152 is turned ON in response to depression of the brake pedal to produce a HIGH level braking state indicative signal Sb. The throttle angle sensor 154 comprises a potentiometer, for example, and designed for monitoring angular position of a throttle valve in an induction system of an automotive engine. The throttle angle sensor 154 outputs a throttle angle position indicative signal TVO representative of the throttle valve angular position.

Figure 3:
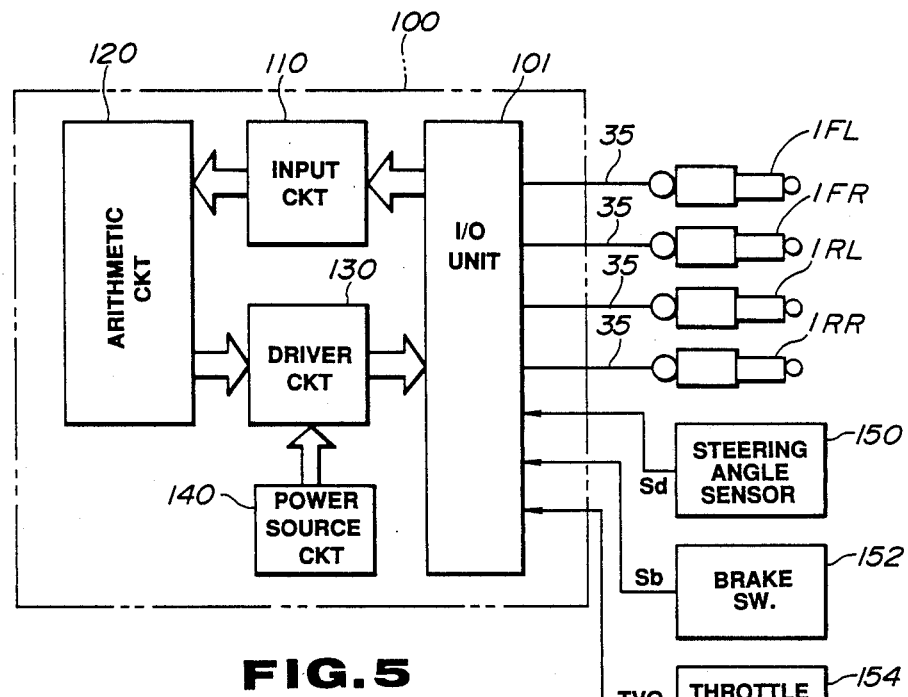
FIG. 3 is a block diagram of the control unit employed in the preferred embodiment of an automotive suspension system and designed for implementing the preferred suspension control process.
Figure 4:
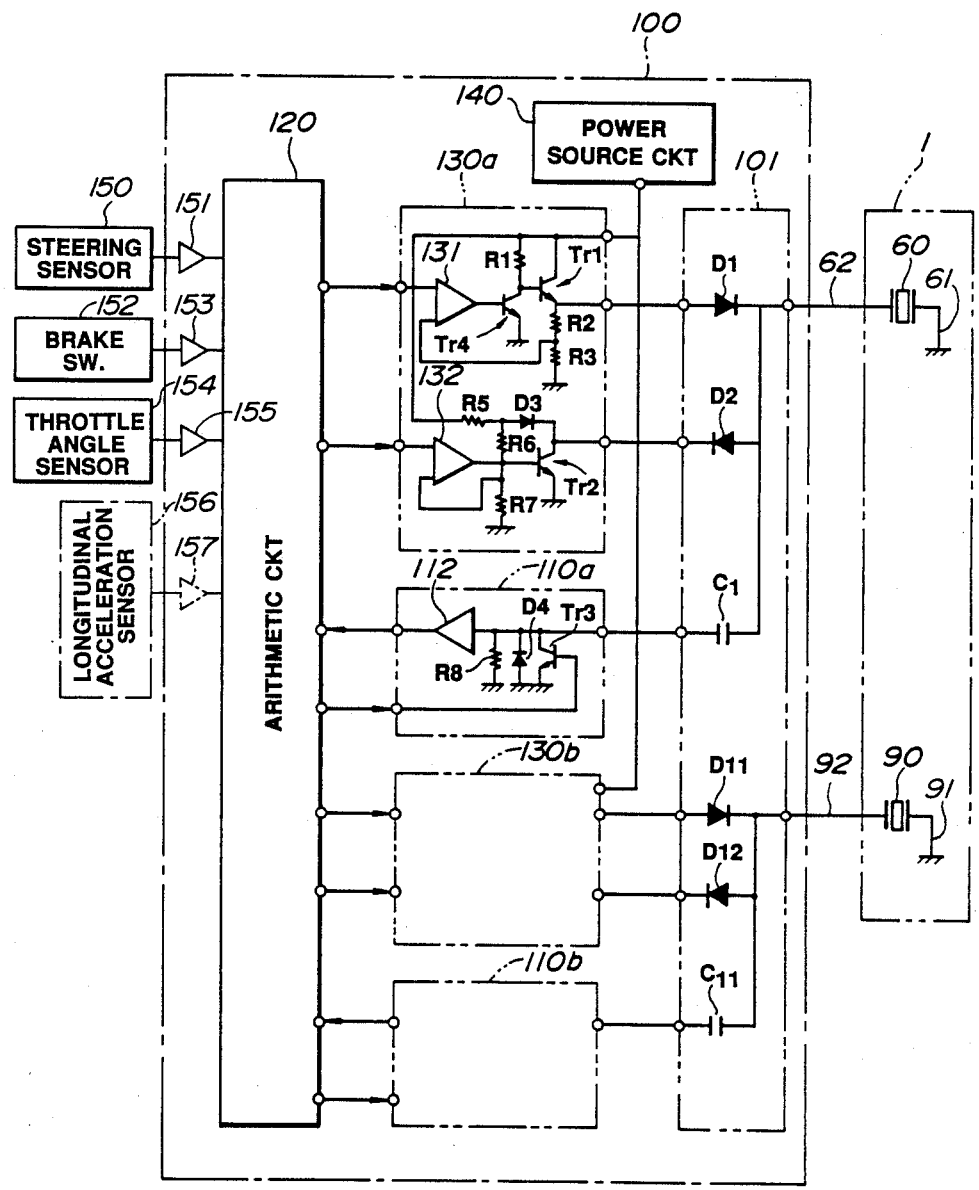
FIG. 4 is a detailed block diagram of the control unit of FIG. 3.

As shown in FIG. 3, the control unit 100 comprises a microprocessor based circuit including an input/output (I/O) port 101, an input circuit 110, an arithmetic circuit 120, a driver circuit 130 and a driver power source circuit 140. The I/O unit 101 is connected to respective damping control mechanisms 70 of the shock absorbers 1 disposed in front-left, front-right, rear-left and rear-right suspension systems via the cables 62 and 92 of the wiring harnesses 35. The compression mode pressure indicative signals Sp and the expansion mode pressure indicative signals Ss generated by the piezoelectric elements 60 and 90 of respective shock absorbers 1 are input to the control unit 100 through the I/O port 101. The I/O unit 101 has a plurality of control channels respectively adapted to control the piezoelectric elements 60 and 90 in respective shock absorbers 1 of front-left, front-right, rear-left and rear-right suspension systems, though FIG. 4 shows only one shock absorber 1. Each control channel has first and second I/O sections 101a and 101b for receiving pressure indicative signals Sp and Ss and outputting the control signals $S_A$ and $S_B$. The first control section 101a has a capacitor $C_1$ for receiving the compression mode pressure indicative signal Sp and serving as a filter for removing noise direct current component in input signal. The first control section 101a also has a pair of diodes $D_1$ and $D_2$ arranged at opposite polarities.

Similarly, the second control section 101b has a capacitor $C_{11}$ for receiving the compression mode pressure indicative signal Ss and serving as a filter for removing noise direct current component in input signal. The second control section 101b' also has a pair of diodes $D_{11}$ and $D_{12}$ arranged at opposite polarities.

The capacitors $C_1$ and $C_{11}$ are connected to first and second sections 110a and 110b of the input circuit 110 respectively. The first section 130a includes a switching transistor $Tr_3$ and an amplifier 112. The switching transistor $Tr_3$ has a base electrode connected to one output terminal of the arithmetic circuit to receive therefrom a selector command. The transistor $Tr_3$ has a collector electrode connected to a junction between the capacitor $C_1$ of the I/O unit 101 and the amplifier 112. The emitter electrode of the switching transistor $Tr_3$ is grounded. In addition, the first section 110a includes a diode $D_4$ and a resistor $R_8$. With the shown construction, the selector command is normally held OFF to input LOW level command to the base electrode of the switching transistor $Tr_3$. Therefore, the switching transistor $Tr_3$ is normally held OFF to break connection between the junction and the ground. At this position, the compression mode pressure indicative signal Sp is fed to the amplifier 112 and subsequently to the arithmetic circuit 120. On the other hand, the switching transistor Tr₃ is responsive to the HIGH level selector command to turn ON to establish grounding circuit for grounding the junction between the capacitor $C_1$ and the amplifier 112. As a result, the compression mode pressure indicative signal Sp from the first piezoelectric element 60 is grounded. Therefore, the input to arithmetic circuit 120 from the amplifier 112 becomes substantially zero.

Figure 5:
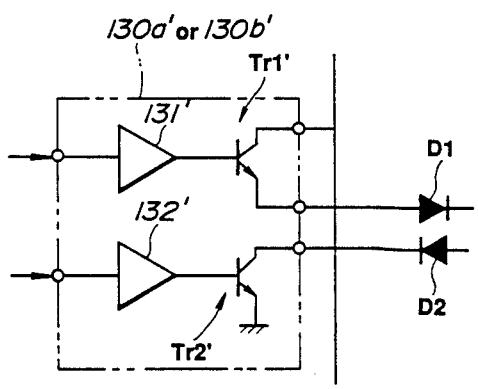
FIG. 5 is circuit diagram of the simplified modification of an output circuit in the control unit.

It should be should be appreciate, though FIG. 5 shows simple block 110b to show the second section of the input circuit, the circuit construction and function of the second section are identical to that discussed with respect to the first section.

The driver circuit 130 also includes first and second sections 130a and 130b. The first section 130a of the driver circuit 130 has a control section 130c and a switching section 130d. Both of the control section 130c and the switching section 130d are connected to the arithmetic circuit 120 for receiving the expansion mode control signal $S_A$. The control section 130c has an operational amplifier 131 high compares the expansion mode control signal level $S_A$ with a feedback signal level fed back from the output end via a voltage divider constituted by resistors $R_2$ and $R_3$. As long as the expansion mode control signal level is higher than the feedback signal level, the output level of the operational amplifier 131 outputs LOW level signal to maintain the input level of a gate electrode of a transistor Tr₄ at LOW level. Therefore, the bias at the collector electrode of the transistor Tr₄ becomes HIGH to turn a transistor Tr₁ ON. By turning ON of the transistor Tr₁, the driver voltage is fed to the piezoelectric element 60 to expand the axial length of the latter to switch the damping mode of the damping mode control mechanism 70 from SOFT mode to HARD mode.

On the other hand, the switching section 130d also has an operational amplifier 132. The operational amplifier 132 receives the expansion mode control signal $S_A$ and compares the expansion mode control signal level with a reference level which is input from the driver power source circuit via a resistor $R_5$ and a voltage divider constituted by resistors $R_6$ and $R_7$. With this circuit connection, the output of the operational amplifier 132 is maintained at LOW level to maintain a switching transistor Tr₂ at non-conductive state for blocking communication between the diode $D_2$ and the ground while the input level from the arithmetic circuit 120 stays lower than a reference level input from the voltage divider of the resistors $R_6$ and $R_7$. It should be noted that the reference level is determined by the resistances of the resistances of the resistors $R_6$ and $R_7$, which reference level is set at a level corresponding to a predetermined initial stress level to exert on the first piezoelectric element 60. On the other hand, when the expansion mode control signal level $S_A$ from the arithmetic circuit is higher than or equal to the reference level, the output level of the operational amplifier 132 turns into HIGH level to turn the transistor Tr₂ ON. As a result, the diode $D_2$ is connected to the ground via the transistor Tr₂. Therefore, the voltage signal as the driver voltage on the cable 62 is grounded so that the expansion mode control signal voltage $S_A$ applied to the first piezoelectric element 60 can be discharged. The Transistor Tr₂ is maintained in conductive state until the potential at the first piezoelectric element 60 drops to the initial level, at which the input level from the arithmetic circuit is lowered across the reference level.

In the shown embodiment, the steering angle sensor 150, the brake switch 152 and the throttle angle sensor 154 are connected to the arithmetic circuit 120 via buffer amplifiers 151, 153 and 155, as shown in FIG. 4. In addition, FIG. 4 shows a longitudinal acceleration sensor 156 connected to the arithmetic circuit 120 via a buffer amplifier 157 as illustrated by phantom line. The longitudinal acceleration sensor 156 is designed for monitoring a longitudinal acceleration exerted on the vehicular body and producing a longitudinal acceleration indicative signal Gs. Though the drawings do not clearly show, an analog-to-digital (A/D) converter may be interposed between analog signal source, such as the throttle angle sensor, for converting the analog form input signal into microprocessor applicable digital data. It should be noted that though FIG. 4 shows the longitudinal acceleration sensor 156, the brake switch 152 and the throttle angle sensor 154, either of the longitudinal acceleration sensor 156 or combination of the brake switch 152 and the throttle angle sensor 154 can be neglected because these monitors the common parameter representative of vehicular acceleration and deceleration.

It should be noted while the shown construction employs a specific circuit construction to implement the desired mode switching operation for switching operational mode of the first piezoelectric element 60 between a sensor mode for monitoring the fluid pressure in the lower working fluid chamber 15 and an actuator mode for controlling damping mode, it is possible to employ different construction of circuit. For example, as shown in FIG. 5, each of the output circuits 130a and 130b can comprise a pair of buffer amplifier 131' and 132' and transistors Tr₁' and Tr₂'. In such case, the arithmetic circuit 120 selectively feeds the expansion mode control signal $S_A$ for the buffer amplifiers 131' and 132'. Namely, while the harder damping characteristics is to be ordered, the arithmetic circuit 120 feeds the expansion mode control signal $S_A$ to the buffer amplifier 131' to turn the transistor Tr₁' conductive to apply controlled voltage of the expansion mode control signal. On the other hand, in order to lower damping characteristics, the expansion mode control signal is fed to the buffer amplifier 132' to make the transistor Tr₂ ON to complete grounding circuit for discharging the control signal voltage applied to the first piezoelectric element 60.

As will be seen herefrom, the piezoelectric element 60 acting for monitoring the fluid pressure level in the lower working chamber 15, the capacitor $C_1$ of the first section 101a of the I/O unit 101, the first section 110a, the arithmetic circuit 120, the second section 130b of the output circuit and pair of diodes $D_{11}$ and $D_{12}$ of the second section 101b of the I/O unit 101, and the piezoelectric element 90 acting for adjusting the damping mode of the damping mode control mechanism 70 form a compression mode control channel. On the other hand, the second piezoelectric element 90 acting for monitoring the fluid pressure level in the upper working chamber 14, the capacitor $C_{11}$ of the second section 101b of the I/O unit 101, the second section 110b, the arithmetic circuit 120, the second section 130a of the output circuit and pair of diodes $D_1$ and $D_1$ of the first section 101a of the I/O unit 101, and the piezoelectric element 60 acting for adjusting the damping mode of the damping mode control mechanism 70 form an expansion mode control channel.

In order to initially set the piezoelectric elements 60 and 90, adjustment is performed by means of the adjuster nuts 53 and 20. Namely, a predetermined voltage is applied for respective piezoelectric elements 60 and 90. At this position, the adjusted nuts 53 and 20 are rotated to adjust stress to be exerted on the piezoelectric elements 60 and 90. This adjustment is continued until the outlet levels of the piezoelectric elements 60 and 90 become a predetermined level.

The operation to be performed in the preferred embodiment of the suspension system will be discussed hereinbelow with reference to FIGS. 6 to 8.

As shown in FIG. 6(c), the fluid pressure in the upper working chamber 14 is monitored by the second piezoelectric element 90 during the piston expansion stroke. The piezoelectric element 90 is thus produces the the expansion mode pressure indicative signal Ss. At this time, since the output first piezoelectric element 60 is maintained at zero level, discrimination can be made that the piston is in the expansion stroke. Discrimination is made by the arithmetic circuit 120 in the control unit 100. Then, the arithmetic circuit 120 performs arithmetic operation to derive variation rate of the expansion mode pressure indicative signal Ss. The variation rate of the pressure indicative signals Ss and Sp is shown in FIG. 6(c). When the variation rate reaches a predetermined value, the expansion mode control signal ordering harder damping characteristics is output to switch the damping mode from SOFT mode to HARD mode, as shown in periods labeled H in FIG. 6(d). The damping mode is switched back to SOFT mode from the HARD mode when the variation rate decreases across a zero.

On the other hand, during the piston compression stroke, the fluid pressure in the lower working chamber 15 is monitored by both of the first and second piezoelectric elements 60 and 90. The first piezoelectric element 60 then produces the compression mode pressure indicative signal Sp. At the same time, the second piezoelectric element 90 produces the expansion mode pressure indicative signal Ss. Therefore, judgement is then made that the piston is in the compression stroke by the arithmetic circuit 120. Therefore, the arithmetic circuit 120 calculates variation rate of the compression mode pressure indicative Sp. When the variation rate derived on the basis of the compression mode pressure indicative signal Sp reaches the predetermined value, the compression mode control signal $S_B$ is output to the second piezoelectric element 90 to switching damping mode from the SOFT mode to HARD mode. Similarly to the expansion mode, the damping mode will be switched back to the SOFT mode when the variation rate decreases across zero.

Figure 7:
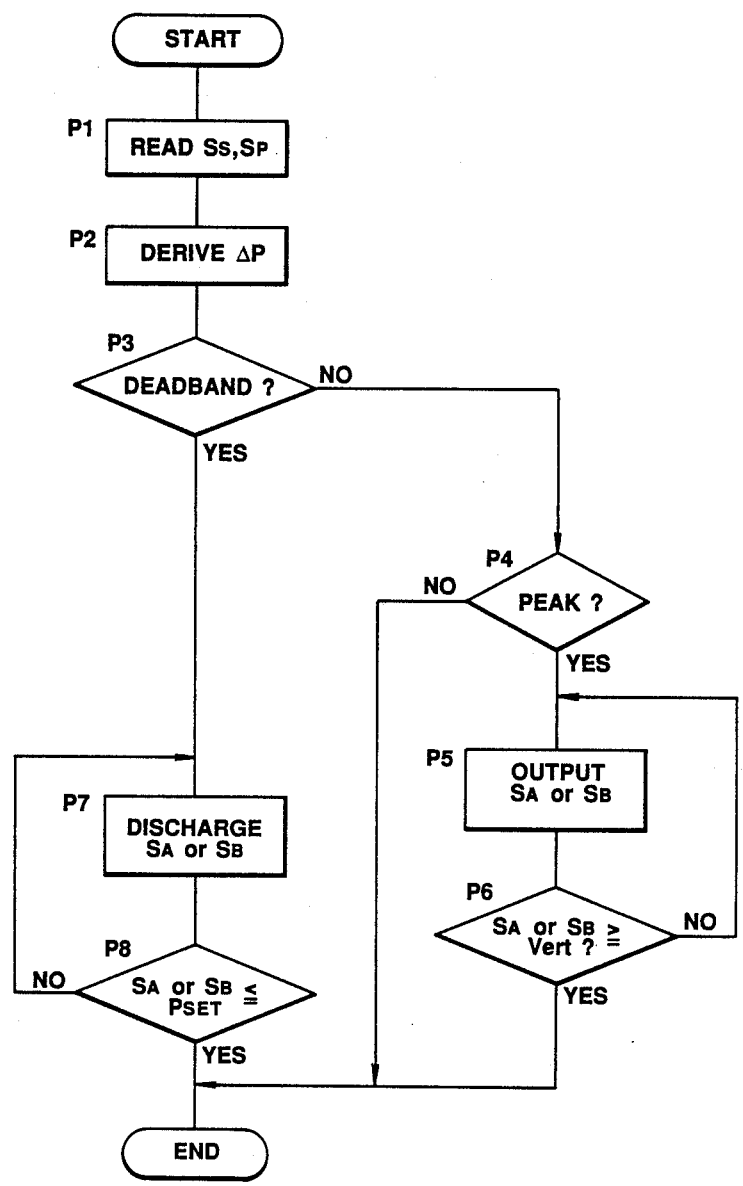
FIG. 7 is a flowchart showing the preferred process of suspension control to be performed in the preferred embodiment of the suspension system.

FIG. 7 shows a flowchart showing operation performed in the arithmetic circuit. Immediately after starting execution, the expansion mode pressure indicative signal Ss and the compression mode pressure indicative signal Sp are read out at a step P1. Then, discrimination is made for the piston stroke direction on the basis of the read expansion mode pressure indicative signal Ss and compression mode pressure indicative signal Sp. As set forth, the piston expansion stroke is detected when the read compression mode pressure indicative signal Sp is held zero. On the other hand, when the compression mode pressure indicative signal Sp is greater than zero, the piston compression stroke is detected. The arithmetic circuit 120 thus selects one of the expansion mode pressure indicative signal Ss and the compression mode pressure indicative signal. Then, at a step P2, variation rate $\Delta P$ is derived on the basis of the selected one of the expansion mode pressure indicative signal Ss and the compression mode pressure indicative signal Sp. Practically, the variation rate $\Delta P$ is calculated by differentiating the selected one of the pressure indicative signals Ss and Sp.

Here, the variation rate $\Delta P$ of the pressure to be exerted on the first and second piezoelectric elements 60 and 90 becomes maximum at the initial space of the piston expansion and compression stroke and becomes minimum (zero) at the peak of vibration. On the other hand, the piston stroke speed becomes higher according to increasing the piston stroke and according to shortening of vibration cycle period. Therefore, by monitoring the variation rate $\Delta P$, magnitude of input vibration can be detected for quicker response. This may provide higher response characteristics to the input vibration in controlling the suspension mode.

It should be appreciated, it is possible to provide a step between the steps P1 and P2 to check the frequency range of the pressure indicative signals for performing suspension control on the basis of the input pressure indicative signal within a predetermined frequency range.

At a step P3, the variation rate $\Delta P$ is checked whether it is in a predetermined deadband which is set with respect to the variation value zero. Namely, the deadband is defined by an upper deadband criterion and a lower deadband criterion. Therefore, the variation rate $\Delta P$ is compared with the upper and lower deadband criteria to make judgement that the variation rate $\Delta P$ is in the deadband when the variation rate is smaller than or equal to the upper deadband criterion and is greater than or equal to the lower deadband. If the variation rate $\Delta P$ as checked at the step P3 is output of the deadband, check is performed whether the variation rate reaches a peak or not, at a step P4. When the peak of the variation rate $\Delta P$ is detected as checked at the step P4, one of the expansion mode control signal $S_A$ or the compression mode control signal $S_B$ is output to the corresponding one of the first and second piezoelectric elements 60 and 90 depending upon the discriminated piston stroke direction at a step P5. Then, at a step P6, the voltage level of the expansion mode control signal $S_A$ or the compression mode control signal $S_B$ output at the step P5, is checked whether the voltage level is higher than or equal to a voltage threshold level $V_{ref}$. The voltage threshold level $V_{ref}$ is set at a minimum voltage for causing distortion in the corresponding one of the first and second piezoelectric element 60 or 90 in order to switch damping mode from the SOFT mode to the HARD mode. Unless, the control signal voltage level as checked at the step P5 becomes higher than or equal to the voltage threshold level $V_{ref}$, process returns to the step P5. The steps P4 and P5 are repeated until the control signal voltage level becomes higher than or equal to the minimum voltage level for driving the associated one of the first and second piezoelectric element 60 and 90. When the control signal voltage level becomes higher than or equal to the voltage threshold level $V_{ref}$ as checked at the step P6, then process goes END.

Though the shown embodiment switches the damping mode between two stages, i.e. HARD mode and SOFT mode, it is possible to vary the damping characteristics in either in or both in the HARD and SOFT mode according to the vibration magnitude. Namely, since the distortion magnitude may essentially linearly proportional to the voltage applied thereto, linear or stepless variation of the damping characteristics can be obtained by linearly or steplessly varying the voltage of the control signal. Practically, it may be possible to vary the control signal voltage according to variation of the variation rate ΔP. Furthermore, it may also be possible to determine the control signal voltage corresponding to the peak level of the variation rate ΔP.

On the other hand, the peak of the variation rate ΔP is not detected as checked at the step P3, check is performed whether it indicates the variation rate is zero, at a step P6. If the variation rate ΔP is greater than zero as checked at the step P6, process directly goes to END.

On the other hand, when the variation rate ΔP is within the deadband as checked at the step P3, the switching transistor $Tr_2$ in the corresponding one of the first and second sections 130a and 130b is turned ON to discharge the voltage applied to the piezoelectric element 60 and 90, at a step P7. Then, at a step P8, one of the expansion mode pressure indicative signal Ss and the compression mode pressure indicative signal Sp, which is selected at the step P1, is again checked against a set value $P_{set}$. As long as the checked pressure indicative signal is greater than the set value $P_{set}$ as checked at the step P8, the steps P7 and P8 are repeated to discharge the voltage applied corresponding one of the piezoelectric element 60 or 90 at a level lower than or equal to the set value $P_{set}$.

Figure 8:
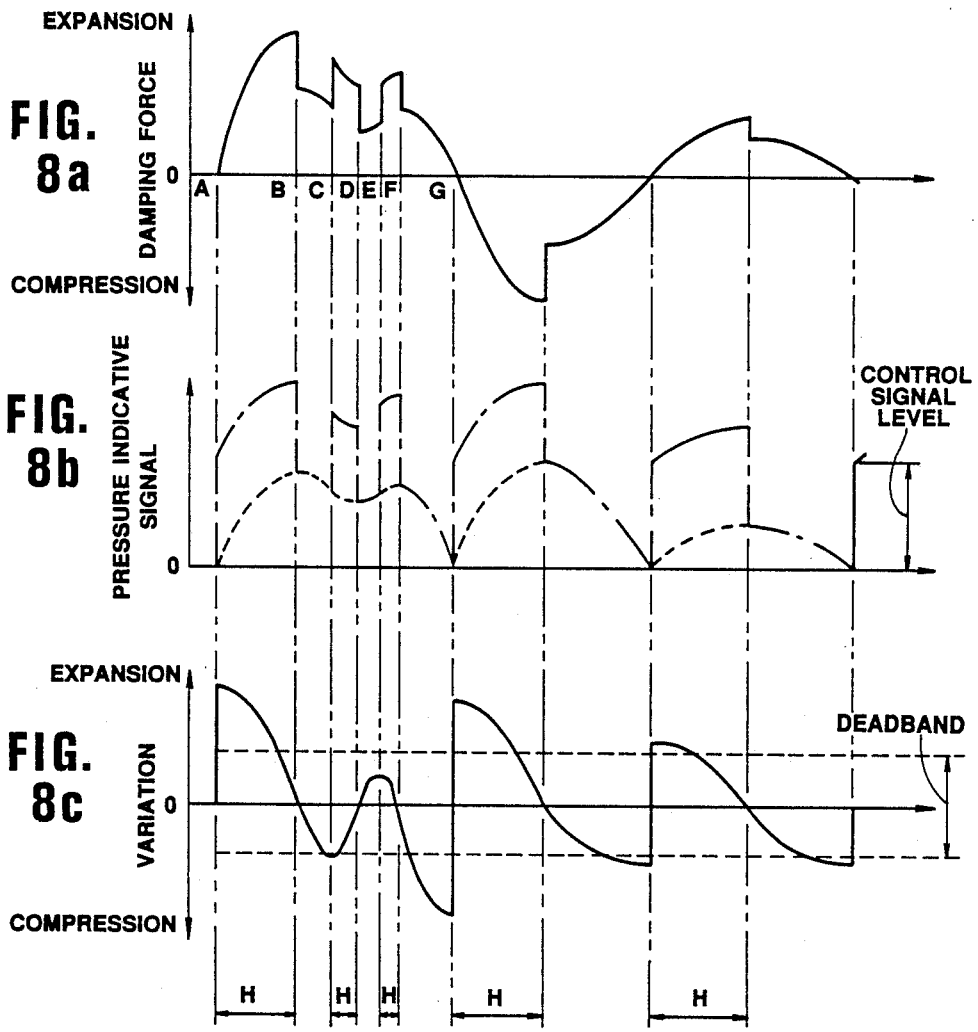
FIGS. 8a, 8b and 8c are timing charts showing control operations performed in the preferred embodiment of the suspension system.

FIG. 8 shows timing chart showing example of operation practically performed in the preferred embodiment of the suspension system according to the present invention. In the shown example, it is assumed that the variation rate ΔP of the expansion mode pressure indicative signal Ss and the compression mode pressure indicative signal Sp varies as shown in FIG. 8(c). At a point A, the variation rate ΔP rapidly increased to be greater than or equal to the predetermined value $P_{ref}$. Then, the damping mode is switched from SOFT mode to HARD mode as shown in the period between the point A and a point B. During this period, the pressure indicative signal Ss or Sp is shifted in a magnitude corresponding to the voltage level of the driver signal exerted on the corresponding piezoelectric element, as shown by one-dotted line in FIG. 8(b). As can be seen from FIG. 8(b), the pressure indicative signal thus varies according to variation of the fluid pressure in the corresponding one of the upper and lower working chamber as shown by broken line in FIG. 8(b). At the point B, the vibration reaches the peak thus the variation rate ΔP becomes zero. In response to this, the damping mode is switched from HARD mode to SOFT mode.

As seen from FIG. 8(a), assuming that the vibration is caused in rebounding direction to cause expansion stroke of the piston, the damping force created against the piston expansion stroke is increased by setting the damping mode at HARD mode as that shown in the period between the point A and the point B. After B, the piston strokes in the compression direction to return the initial position. In such case, the damping mode is set at SOFT mode for effectively absorbing the vibration energy as shown in the period between the point B and a point C. At the point C, variation rate ΔP in the compression mode reaches a value greater than the predetermined value $P_{ref}$ to again causing switching of the damping mode from SOFT mode to HARD mode. Therefore, from the point C to a point D greater damping force against the piston stroke is generated. Similarly to the process set forth with respect to the point B, the variation rate ΔP becomes zero at the point D. On the other hand, at the point E, the variation rate ΔP again reaches the peak. However, since the variation rate is within the deadband as illustrated in FIG. 8(c), the damping mode is not switched into HARD mode and thus is maintained at SOFT mode during the period between the point E and point F. By repeating the foregoing process, the damping modes are switched between HARD mode and SOFT mode during the period between the points F and G.

As will be appreciated herefrom, since the shown embodiment performs damping mode control in piston expansion and compression strokes independently of each other, effective suppression of piston strokes and absorption of the vibration energy can be achieved. Furthermore, in the shown embodiment, since the first piezoelectric element 60 is active for detecting fluid pressure in the lower working chamber 15 during piston compression stroke and the second piezoelectric element 90 is active for adjusting damping mode between the HARD mode and SOFT mode in the piston compression stroke; and since the second piezoelectric element 90 is active for detecting fluid pressure in the upper working chamber 14 during piston expansion stroke and the second piezoelectric element 60 is active for adjusting damping mode between the HARD mode and SOFT mode in the piston expansion stroke, monitoring of the fluid pressure and damping mode control can be performed independently at the same time. Therefore, damping mode control with high precision and high response characteristics can be obtained.

In addition, in accordance with the shown embodiment, the shock absorber is maintained in soft against relatively small magnitude of vibration. This will successfully avoid rough ride feeling and thus assures riding comfort. Namely, as is well known, the vibration energy input from the road wheel is usually have small magnitude and high frequency, which vibration energy will not influence for vehicle driving stability and is better to be absorbed so as not to be transmitted to the vehicle body for assuring riding comfort. On the other hand, the vibration energy input from the vehicle body is generally caused by vehicular attitude change. This has to be damped for assuring vehicle driving stability. Therefore, by providing the deadband in controlling damping mode of the shock absorber, both of riding comfort and driving stability can be achieved at high level.

Figure 9:
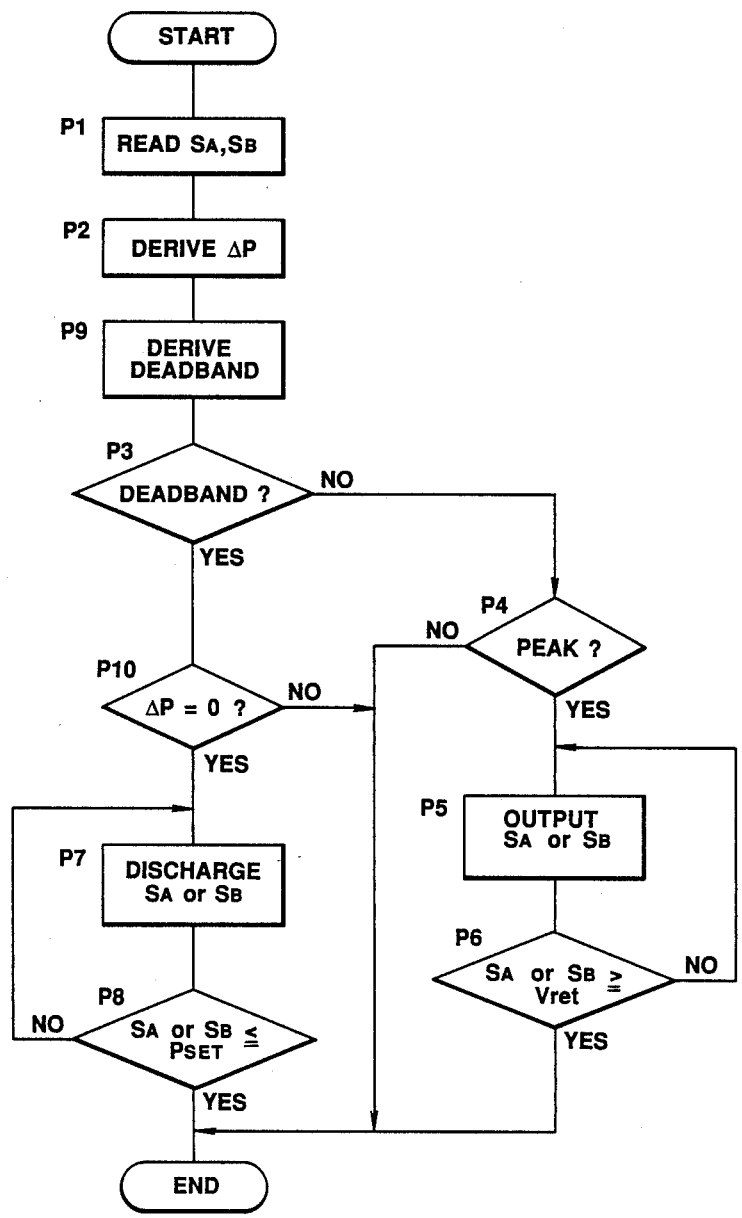
FIG. 9 is a flowchart showing a modified process of suspension control to be preferred embodiment of the suspension system.

On the other hand, the magnitude of vibration energy of road shock and vehicular attitude change tends to be varies according to the vehicle speed. Namely, higher vehicular speed may generate greater magnitude of road shock input from the road wheel and cause greater attitude change on the vehicle body. Therefore, it is further preferable to vary the width of the deadband, i.e. the upper and lower deadband criteria, depending upon the vehicle speed. FIG. 9 shows modification of the routine for controlling damping mode of the shock absorber according to the present invention, in which vehicle speed dependent variable deadband width is introduced for successfully adapting suspension control characteristics to the vehicle driving speed. In the shown routine, an additional step P9 is inserted between the steps P2 and P3 in the routine of FIG. 7. In the additional step P9, the width of the deadband relative to the variation rate zero level is determined according to a vehicle speed. The width of the deadband can be varied in various fashion. In addition, an additional step P10 is added between the steps P3 and P7. In the additional step P10, check whether the variation rate ΔP is zero or not, is performed. When the variation rate is not zero, process directly goes END jumping the steps P7 and P8. On the other hand, when the variation rate is zero as checked at the step P10, then process goes to the step P7.

In the shown process adjustment of the width of the deadband can be done in various ways. For example, in FIG. 10, the width of deadband is varied continuously according to variation of the vehicle speed. On the other hand, in the example of FIG. 12, the width of the deadband is varied between wide and narrow when the vehicle speed is varied across a predetermined vehicle speed criterion. It should be appreciated that in either case, the variation characteristics of the width of the deadband may be determined through experiments with respect to the required performance and characteristics of the vehicle to which the suspension system being installed and other factors. As will be seen from FIG. 10, in the former case, the width of the deadband is set broader at low vehicle speed range. When the vehicle speed is lower than a predetermined low vehicle criterion, the width of the deadband is maintained constant at a predetermined maximum value. On the other hand, when the vehicle speed is higher than or equal to the low speed criterion and lower than or equal to a predetermined high vehicle speed criterion, the width of the deadband is varied according to variation of the vehicle speed in non-linear fashion. When the vehicle speed is higher the high vehicle speed criterion, the width of the deadband is maintained at a predetermined minimum width.

Figure 10:
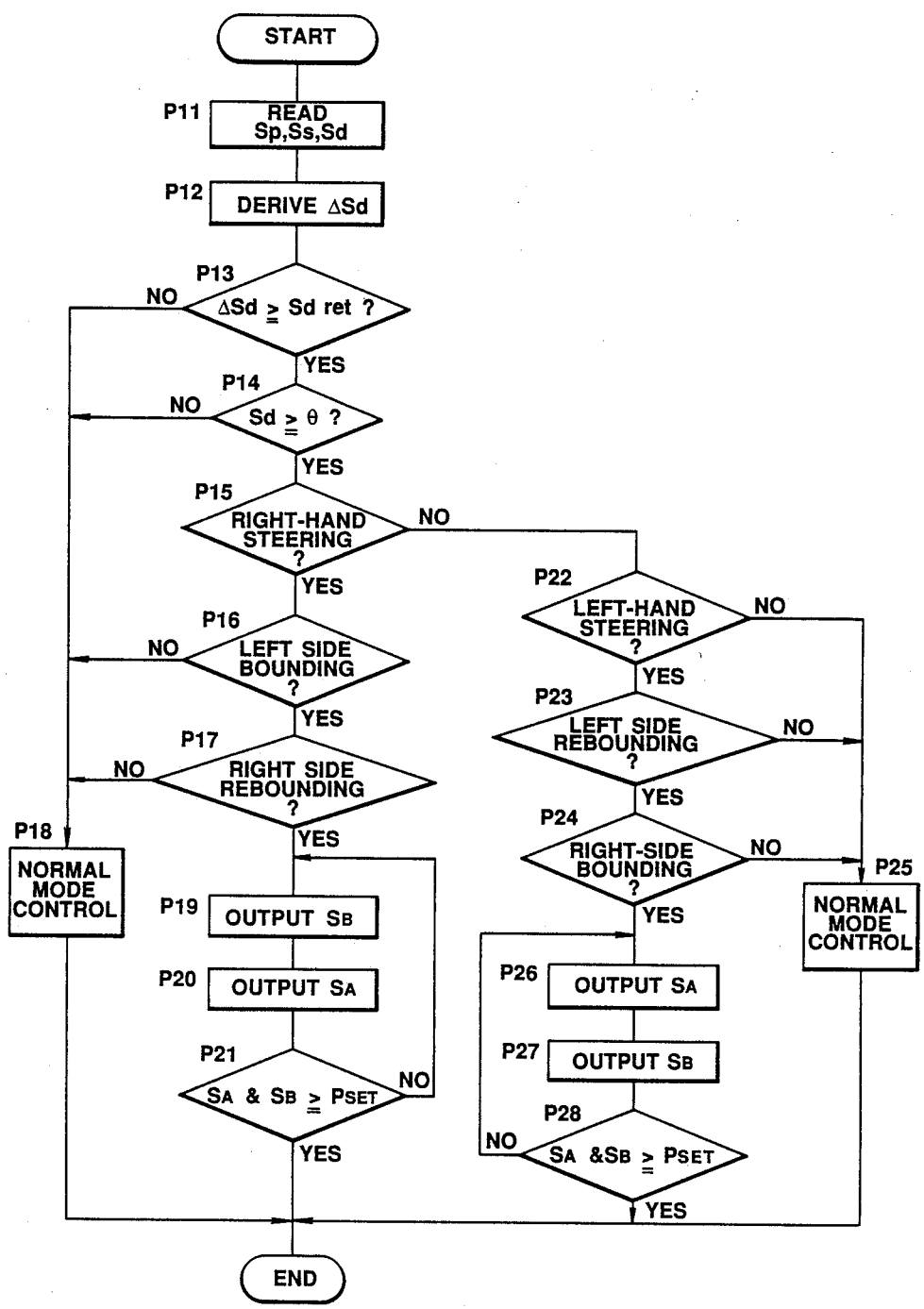
FIG. 10 is a flowchart of an anti-rolling suspension control routine to be executed in the preferred embodiment of the suspension system according to the invention.

In order to implement the foregoing process, the arithmetic circuit 120 may include a memory for storing the characteristics of FIG. 10 in a form of a look-up table. Table look-up may be performed in terms of the vehicle speed for deriving the deadband width.

Figure 12:
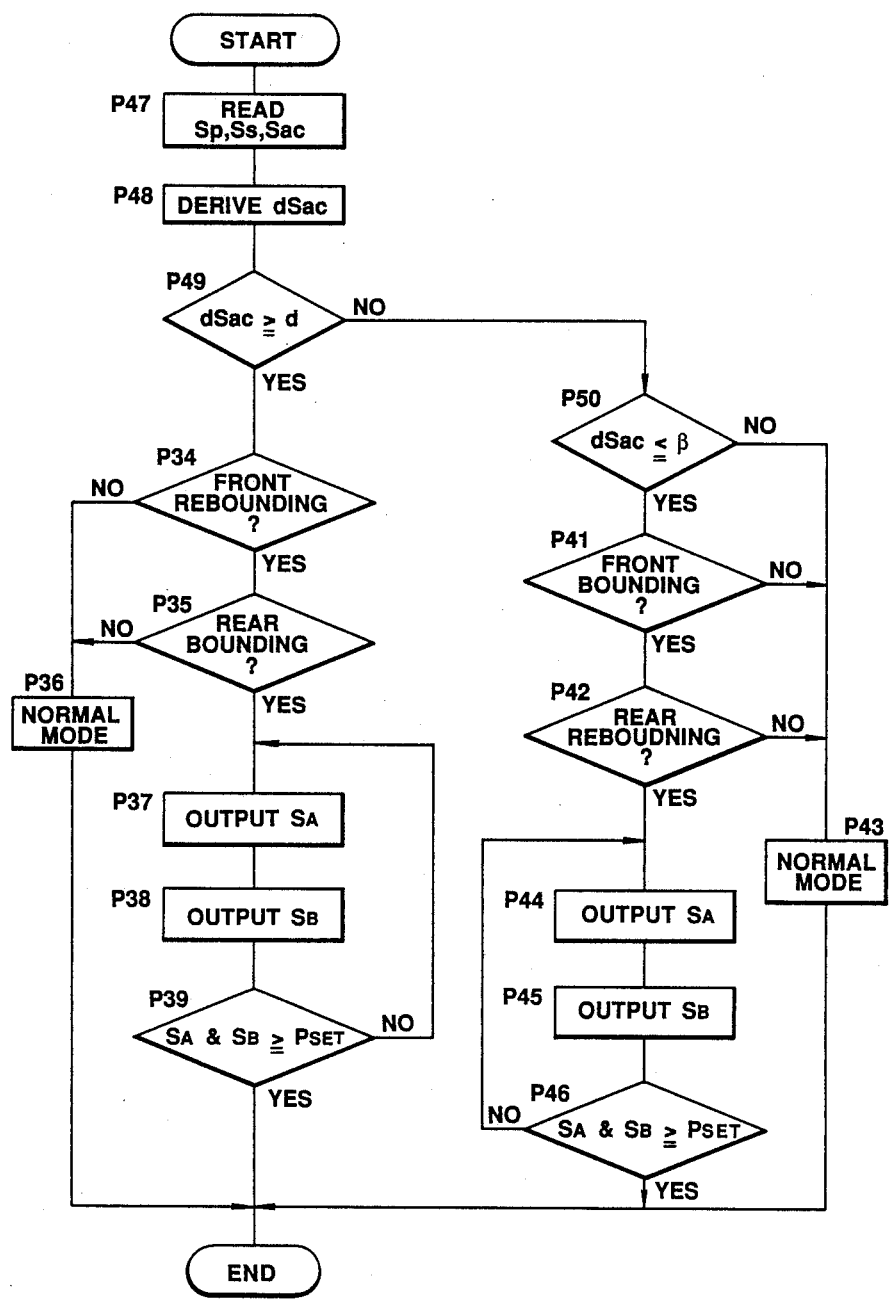
FIG. 12 is a flowchart of a modification of the anti-rolling suspension control routine of FIG. 11.

On the other hand, in the latter case of FIG. 12, the width of the deadband is switched from wider width to narrower width when the vehicle speed increases across a predetermined narrower width criterion and is switched from narrower width to wider width when the vehicle speed decreases across a predetermined narrower width criterion which is set to be lower than the wider width criterion so as to provide hysteresis in selection of the wide and narrower width of the deadbands.

In the latter case, it may also be possible to perform different mode of suspension control for respective of front and rear suspension systems. One possible mode is to switch into narrower deadband from wider deadband for both of front and rear suspension systems simultaneously in response to increasing of the vehicle speed across the narrower width criterion. Alternatively, it is possible to switch the width of the deadbands for the front and rear suspension systems at different timing for providing different response characteristics at the front and rear suspension systems.

Figure 11:
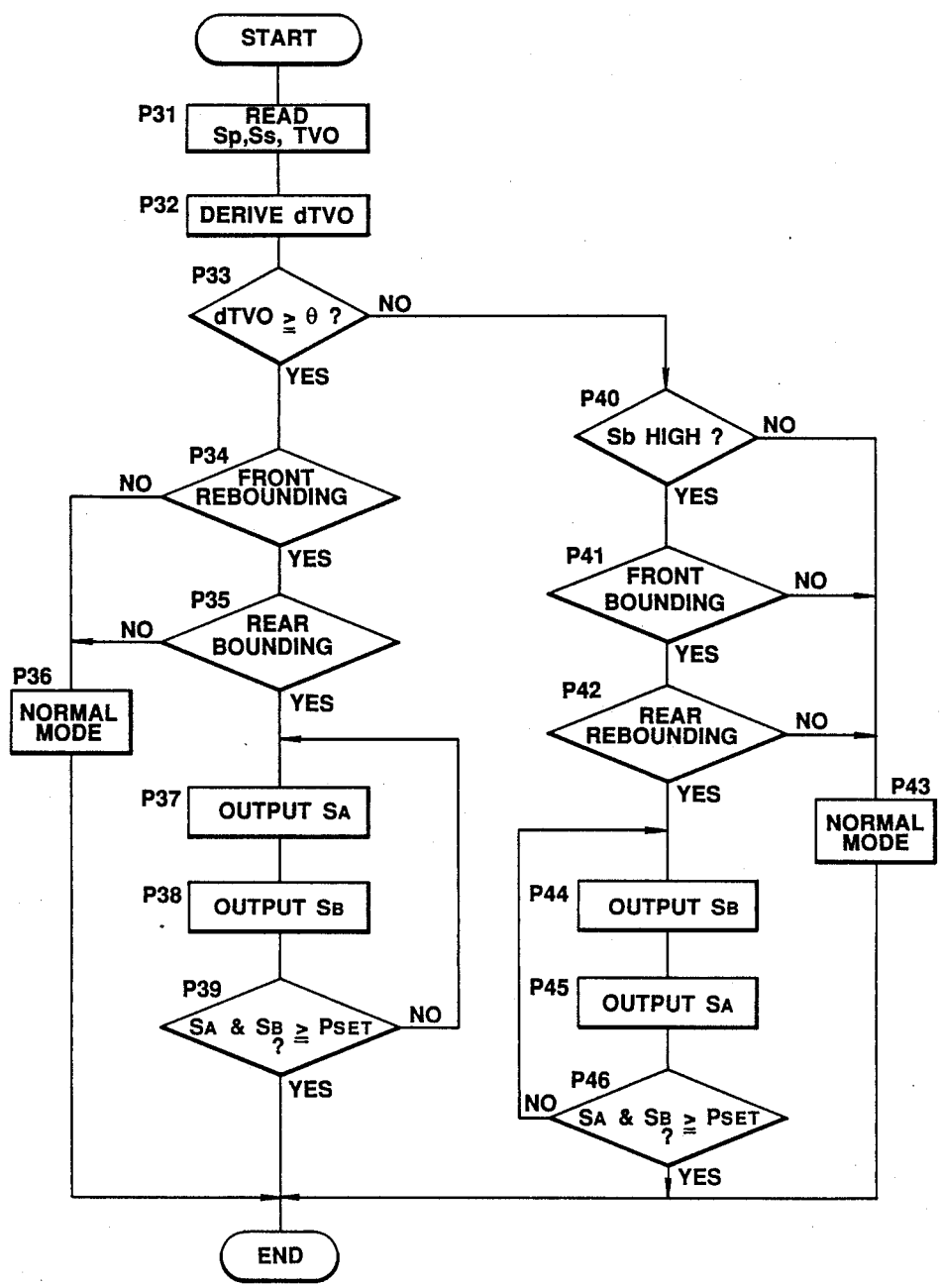
FIG. 11 is a flowchart showing an anti-pitching suspension control routine to be executed in the preferred embodiment of the suspension system according to the invention.

Attitude change suppressive suspension control operation to be performed in the shown embodiment of the suspension system, according to the invention, will be discussed herebelow with reference to FIGS. 10, 11 and 12. In shown processes, FIGS. 11 and 12 show anti-pitching control in performing similar control with different control parameters. The shown routines are periodically triggered every predetermined timing, e.g. every 20 ms. The shown routines are governed by a main program which is executed as a background job.

FIG. 10 shows a routine for performing anti-rolling suspension control. Immediately after starting execution, the compression mode pressure indicative signal Sp, the expansion mode pressure indicative signal Ss and the steering angle indicative signal Sd are read out at a step P11. Based on the steering angle indicative signal Sd, a rate ΔSd of steering angular displacement is derived at a step P12. The derived steering angular displacement rate ΔSd is compared with a predetermined steering angle displacement rate threshold $Sd_{ref}$ at a step P13. When the steering angular displacement rate ΔSd is greater than or equal to the steering angle displacement rate threshold $Sd_{ref}$, the value of the steering angle indicative signal Sd is compared with a predetermined steering angle threshold θ, at a step P14.

It should be noted that the steering angle displacement rate threshold $Sd_{ref}$ and the steering angle threshold θ are determined experimentarily so that the vehicular traveling condition through curved road which causes vehicular rolling.

When the steering angle indicative signal Sd is greater than or equal to the steering angle threshold θ as checked at the step P14, check is performed whether the vehicular rolling is caused by right-hand steering or cornering which causes lowering of height at the left-side of the vehicular body and lifting-up at the right-side, at a step P15. Namely, in response to right-hand steering, left-hand rolling is caused as set forth above. If the answer at the step P15 is positive, then check is performed whether the pistons 4 in the shock absorbers 1FL and 1RL of front-left and rear-left suspension systems are in bounding stroke, at a step P16. When the answer at the step P16 is positive, check is also performed whether the pistons 4 in the shock absorbers 1FR and 1RR of the front-right and the rear-right suspension systems, are in rebounding stroke, at a step P17. As will be appreciated from the discussion given hereabove, vehicular steering behaviour in a magnitude and rate requiring anti-rolling control is detected through the steps P13 and P14. On the other hand, in the steps P16 and P17, actual occurrence of the vehicular rolling in left-hand direction is detected. Therefore, when the answer at the step P17 is positive, it means that vehicular rolling toward left is caused by right-hand steering operation.

In case that the any one of the answers in the steps P13, P14, P16 and P17 is negative, process goes to a step P18, in which normal mode suspension control according to the process illustrated in FIGS. 7 or 9.

When the answer at the step P17 is positive to indicate the condition satisfying a condition for performing anti-rolling suspension control, then the compression mode control signal $S_B$ is output for the piezoelectric element 90 of the front-left and rear-left shock absorbers 1FL and 1RL for hardening damping characteristics thereof at a step P19. Subsequently, at a step P20, the expansion mode control signal $S_A$ is output for the piezoelectric elements 60 of the right-front and the right-rear shock absorbers 1FR and 1RR for hardening damping characteristics thereof. Through the steps P19 and P20, the damping characteristics against the piston stroke direction can be hardened with maintaining the damping characteristics for the direction opposite to the piston stroke direction at neutral. Therefore, against the piston stroke in bounding direction in the front-left and rear-left shock absorbers 1FL and 1RL, harder damping force is generated in order to reduce magnitude of piston bounding stoke. On the other hand, against the piston stoke in rebounding direction in the front-right and rear-right shock absorbers 1FR and 1RR, harder damping force is generated in order to reduce magnitude of piston rebounding stoke. Therefore, magnitude of left-hand rolling can be successfully reduced.

It should be appreciated that the level of the compression mode control signal $S_B$ and the expansion mode control signal $S_A$ to be output may be variable depending upon the rate of steering angular displacement which generally affects to magnitude of vehicular rolling.

Though the shown embodiment controls damping characteristics of both of left side and right side shock absorbers, it may be possible to suppress left-hand rolling by hardening damping characteristics of the front-left and rear-left shock absorbers 1FL and 1RL which are in bounding stroke.

After outputting the control signals $S_B$ and $S_A$ at the steps S19 and S20, the control signal levels are checked against the predetermined value $P_{ref}$. Until the level of the control signals $S_B$ and $S_A$ reaches the predetermined value $P_{ref}$, the process over the steps P19, P20 and P21 are repeated.

On the other hand, when the steering direction is not right-hand as checked at the step P15 and thus the answer is negative, then check is performed whether the steering direction is left-hand at a step P22. If the answer at the step P22 is positive, then check is performed whether the pistons 4 in the shock absorbers 1FL and 1RL of front-left and rear-left suspension systems are in rebounding stroke, at a step P23. When the answer at the step P23 is positive, check is also performed whether the pistons 4 in the shock absorbers 1FR and 1RR of the front-right and the rear-right suspension systems, are in bounding stroke, at a step P24.

In case that the any one of the answers in the steps P22, P23 and P24 is negative, process goes to a step P25, in which normal mode suspension control according to the process illustrated in FIGS. 7 or 9.

When the answer at the step P24 is positive to indicate the condition satisfying a condition for performing anti-rolling suspension control, then the expansion mode control signal $S_A$ is output for the piezoelectric element 60 of the front-left and rear-left shock absorbers 1FL and 1RL for hardening damping characteristics thereof at a step P26. Subsequently, at a step P27, the compression mode control signal $S_B$ is output for the piezoelectric elements 90 of the right-front and the right-rear shock absorbers 1FR and 1RR for hardening damping characteristics thereof. Through the steps P26 and P27, the damping characteristics against the piston stroke direction can be hardened with maintaining the damping characteristics for the direction opposite to the piston stroke direction at neutral. Therefore, against the piston stroke in bounding direction in the front-right and rear-right shock absorbers 1FR and 1RR, harder damping force is generated in order to reduce magnitude of piston bounding stoke. On the other hand, against the piston stoke in rebounding direction in the front-left and rear-left shock absorbers 1FL and 1RL, harder damping force is generated in order to reduce magnitude of piston rebounding stoke. Therefore, magnitude of right-hand rolling can be successfully reduced.

Though the shown embodiment controls damping characteristics of both of left side and right side shock absorbers, it may be possible to suppress left-hand rolling by hardening damping characteristics of the front-right and rear-right shock absorbers 1FR and 1RR which are in bounding stroke.

After outputting the control signals $S_A$ and $S_B$ at the steps S26 and S27, the control signal levels are checked against the predetermined value Pref Until the level of the control signals $S_A$ and $S_B$ reaches the predetermined value $P_{ref}$, the process over the steps P26, P27 and P28 are repeated.

When the answer at the step P21 or P28 becomes positive, process returns to the background job.

FIG. 11 show a process of anti-pitching suspension control for suppressing nose dive during deceleration and squat during acceleration. In the shown process, the compression mode pressure indicative signal Sp, the expansion mode pressure indicative signal Ss and the throttle valve angular position indicative signal TVO are read out at a step P31. Based on the throttle valve angular position indicative signal TVO, a variation rate $\Delta$TVO of the throttle valve angular position is derived at a step P32. The throttle valve angular position variation rate $\Delta$TVO is then compared with a throttle valve angular position threshold $\theta_{th}$ at a step P33.

When the throttle valve angular position variation rate $\Delta$TVO is greater than or equal to the throttle valve angular position threshold $\theta_{th}$ as checked at the step P33, check is performed whether the pistons 4 of the front-left and the front-right shock absorbers 1FL and 1FR are in rebounding stroke, at a step P34. When the answer at the step P34 is positive, then check is performed whether the pistons 4 of the rear-left and the rear-right shock absorbers 1RL and 1RR are both in bounding stroke, at a step P35. As can be appreciated, through the steps P34 and P35, occurrence of squat caused by acceleration of the vehicle is checked. When answer in either step of P34 or P35 is negative, it implies that squat is not occurring. Therefore, in such case, process goes to a step P36 to perform normal mode suspension control for absorbing road shock.

On the other hand, when the both of answers at the steps P34 and P35 are positive, the expansion mode control signal $S_A$ is output to the piezoelectric elements 60 of the front-left and front-right shock absorbers 1FL and 1FR for hardening damping characteristics, at a step P37. Then, at a step P38, the compression mode control signal $S_B$ is output to the piezoelectric elements 90 of the rear-left and the rear-right shock absorbers 1RL and 1RR for hardening the damping characteristics. Through the steps P37 and P38, the damping characteristics against the piston stroke direction can be hardened with maintaining the damping characteristics for the direction opposite to the piston stroke direction at neutral. Therefore, against the piston stroke in rebounding direction in the front-left and front-right shock absorbers 1FL and 1FR, harder damping force is generated in order to reduce magnitude of piston rebounding stoke. On the other hand, against the piston stoke in bounding direction in the rear-left and rear-right shock absorbers 1RL and 1RR, harder damping force is generated in order to reduce magnitude of piston bounding stoke. Therefore, magnitude of squat during vehicular acceleration can be successfully reduced.

Though the shown embodiment controls damping characteristics of both of front side and rear side shock absorbers, it may be possible to suppress squat by hardening damping characteristics of the front-left and front-right shock absorbers 1FL and 1FR which are in bounding stroke.

At a step P39, the signal levels of the expansion mode control signal $S_A$ and the compression mode control signal $S_B$ are checked against the predetermined valve $P_{set}$. The steps P37, P38 and P39 are repeated until the signal levels of the expansion mode control signal $S_A$ and $S_B$ reaches the predetermined level $P_{set}$.

Though the process set forth above, squat during acceleration can be successfully suppressed.

On the other hand, when the throttle valve angular position indicative signal value TVO is smaller than the throttle valve angular position threshold $\theta_{th}$, check is performed whether the input signal level from the brake switch 152 is HIGH level, at a step P40. If the answer at the step S40, check is performed whether the pistons 4 of the front-left and the front-right shock absorbers 1FL and 1FR are in bounding stroke, at a step P41. When the answer at the step P41 is positive, then check is performed whether the pistons 4 of the rear-left and the rear-right shock absorbers 1RL and 1RR are both in rebounding stroke, at a step P42. As can be appreciated, through the steps P41 and P42, occurrence of nose dive caused by deceleration of the vehicle is checked. When answer in either step of P41 or P42 is negative, it implies that nose dive is not occurring. Therefore, in such case, process goes to a step P43 to perform normal mode suspension control for absorbing road shock.

On the other hand, when the both of answers at the steps P41 and P42 are positive, the expansion mode control signal $S_B$ is output to the piezoelectric elements 90 of the front-left and front-right shock absorbers 1FL and 1FR for hardening damping characteristics, at a step P44. Then, at a step P45, the compression mode control signal $S_A$ is output to the piezoelectric elements 60 of the rear-left and the rear-right shock absorbers 1RL and 1RR for hardening the damping characteristics. Through the steps P44 and P45, the damping characteristics against the piston stroke direction can be hardened with maintaining the damping characteristics for the direction opposite to the piston stroke direction at neutral. Therefore, against the piston stroke in bounding direction in the front-left and front-right shock absorbers 1FL and 1FR, harder damping force is generated in order to reduce magnitude of piston bounding stoke. On the other hand, against the piston stoke in rebounding direction in the rear-left and rear-right shock absorbers 1RL and 1RR, harder damping force is generated in order to reduce magnitude of piston rebounding stoke. Therefore, magnitude of nose dive during vehicular acceleration can be successfully reduced.

Though the shown embodiment controls damping characteristics of both of front side and rear side shock absorbers, it may be possible to suppress squat by hardening damping characteristics of the rear-left and rear-right shock absorbers 1RL and 1RR which are in bounding stroke.

At a step P46, the signal levels of the expansion mode control signal $S_A$ and the compression mode control signal $S_B$ are checked against the predetermined valve $P_{set}$. The steps P44, P45 and P46 are repeated until the signal levels of the expansion mode control signal $S_A$ and $S_B$ reaches the predetermined level $P_{set}$.

Through the process of the steps P31 through P33 and P40 through P46, nose dive suppressive suspension control can be performed.

When the answer at the step P39 or P46 becomes position, the process returns to the background job.

FIG. 12 also shows anti-pitching suspension control routine as a modification of the routine discussed with respect to FIG. 11. In FIG. 12, only parameter for detecting vehicular acceleration and deceleration is different from that used in the process of FIG. 11. Namely, in the shown process, the longitudinal acceleration exerted on the vehicle body and monitored by means of the longitudinal acceleration sensor 156 of FIG. 4 is used as the accelerating and decelerating state indicative parameter in place of the throttle valve angular position and the brake switch position. Since the remaining part of the routine is identical to that discussed with respect to FIG. 11, the process steps common to that in FIG. 11 will be represented by the same step numbers and will not be discussed in detail in order to avoid redundant recitation.

As can be seen from FIG. 12, the shown routine starts from a step P47, in which the compression mode pressure indicative signal Sp, the expansion mode pressure indicative signal Ss and the longitudinal acceleration indicative signal Sac are read out. Then, the variation rate dSac of the longitudinal acceleration Sac is derived at a step P48. The longitudinal acceleration variation rate dSac is then compared with a vehicular acceleration indicative criterion $\alpha$ at a step P49, which vehicular acceleration indicative criterion $\alpha$ may be set at a value corresponding to the longitudinal acceleration exerted on the vehicle body and to the magnitude of the longitudinal acceleration possibly cause squat. If the longitudinal acceleration variation rate dSac is greater than or equal to the vehicular acceleration indicative criterion $\alpha$, process goes to the step P34 to process of the steps P34 through P39.

On the other hand, if the answer at the step P49 is negative, the longitudinal acceleration variation rate dSac is compared with a vehicular deceleration indicative criterion $\beta$ which represents vehicular deceleration and corresponds to the magnitude of deceleration possibly causing nose dive, at a step P50. Depending upon the result of checking at the step P50, the process through the steps P41 to P46 is performed. As can be clear from the discussion given hereabove, equivalent anti-pitching suspension control to the former process of FIG. 11 can be performed with utilizing the longitudinal acceleration as parameter representative of vehicular accelerating and decelerating state.

Figure 13:
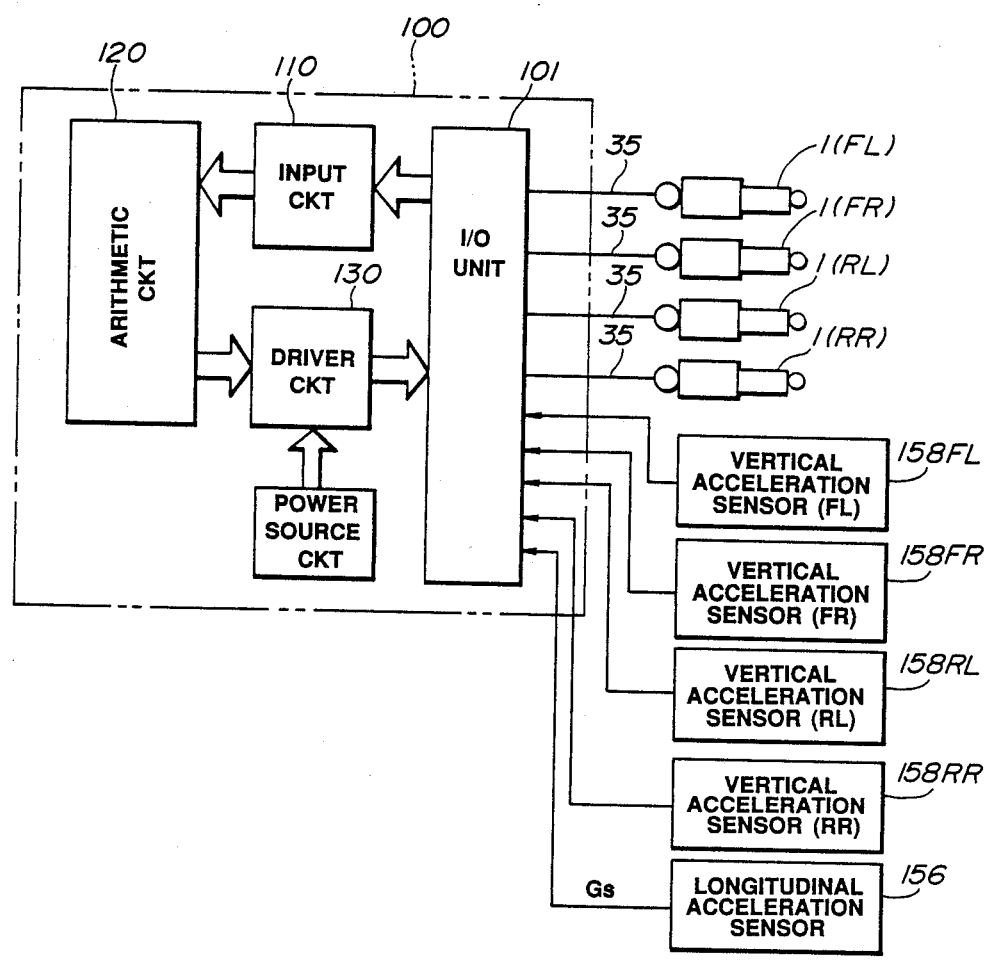
FIG. 13 is a block diagram of another embodiment of a suspension control system for controlling suspension characteristics of the preferred embodiment of the suspension system according to the invention.

FIG. 13 shows another embodiment of the suspension control system including the control unit 100. In the shown embodiment, the control unit 100 is connected to vertical acceleration sensors 158FL, 158FR, 158RL and 158RR which are respectively oriented in the vicinity of the front-left, front-right, rear-left and rear-right suspension systems for monitoring vertical acceleration at associated portions of the vehicular body. Respective of vertical acceleration sensors 158FL, 158FR, 158RL and 158RR will be hereafter referred to as "front-left vertical acceleration sensor", "front-right vertical acceleration sensor", "rear-left vertical acceleration sensor" and "rear-right vertical acceleration sensor". These vertical acceleration sensors may also be generally represented by the reference numeral "158". The front-left vertical acceleration sensor 158FL, the front-right vertical acceleration sensor 158FR, the rear-left vertical acceleration sensor 158RL and the rear-right vertical acceleration sensor 158RR respectively produce front-left vertical acceleration indicative signal $Gs_{FL}$, front-right vertical acceleration indicative signal $Gs_{FR}$, rear-left vertical acceleration indicative signal $Gs_{RL}$ and rear-left vertical acceleration indicative signal $Gs_{RR}$. The control unit 100 performs normal mode suspension control for varying damping characteristics depending upon the piston stroke in each vibration cycle for absorbing road shock and also performs attitude change suppressive suspension control including anti-rolling and anti-pitching utilising the vertical acceleration monitored by the vertical acceleration sensors 158FL, 158FR, 158RL 158RR. The vertical acceleration indicative signals will also be represented by "Gs" as generally referred to. The vertical acceleration indicative signal Gs has a value increasing positive value according to increasing of vertical acceleration in rebounding direction and decreasing (or increasing negative value) according to increasing vertical acceleration in bounding direction. Namely, when the vertical acceleration exerted on the associated portion of the vehicle body is in rebounding direction, the value of the vertical acceleration indicative signal Gs is maintained in positive value and when the vertical acceleration is in bounding direction, the value of the vertical acceleration indicative signal is maintained in the negative value.

Figure 14A:
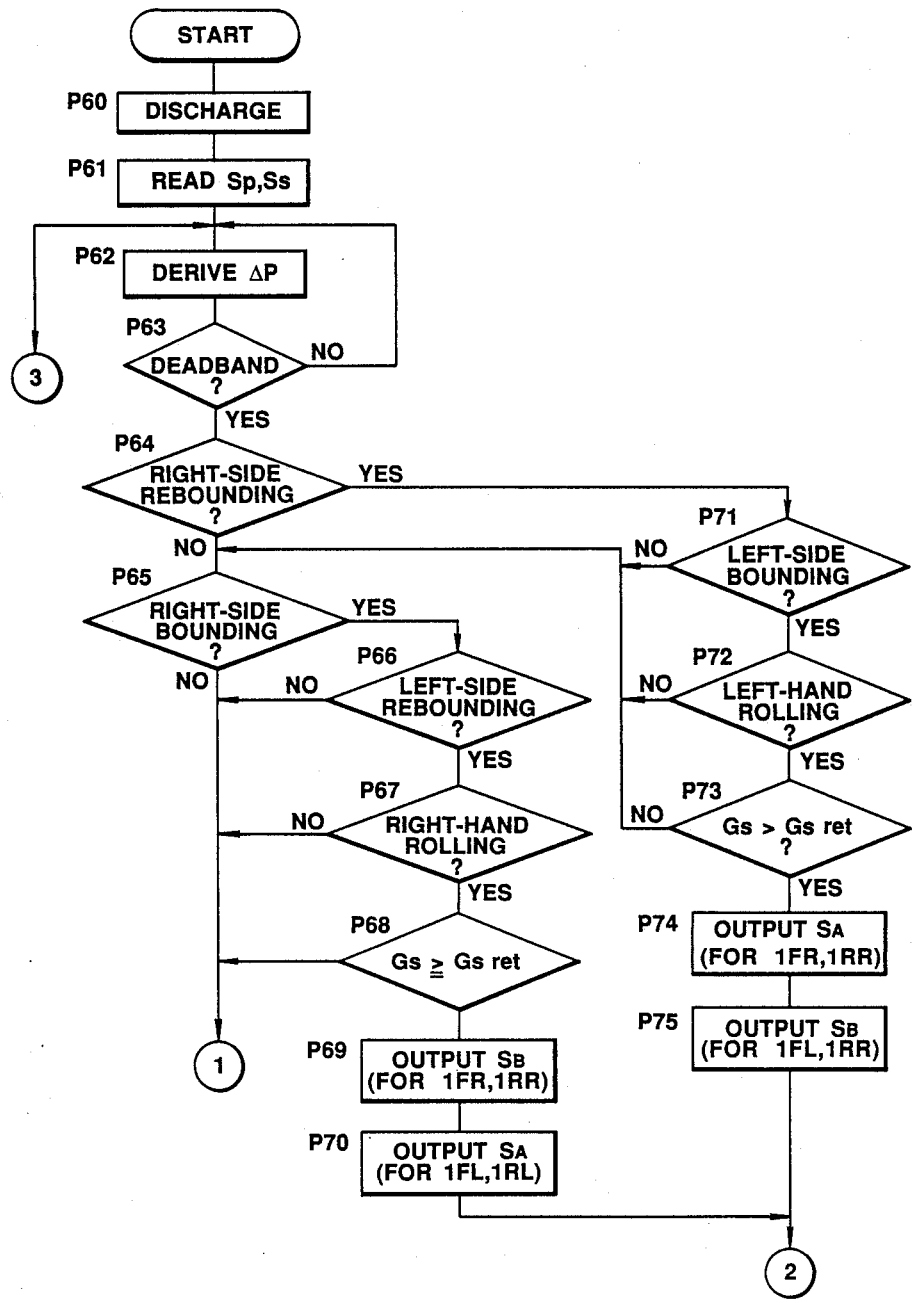
FIG. 14(A) and 14(B) are flowchart showing a sequence of suspension control routine performing both of anti-rolling and anti-pitching suspension control.
Figure 14B:
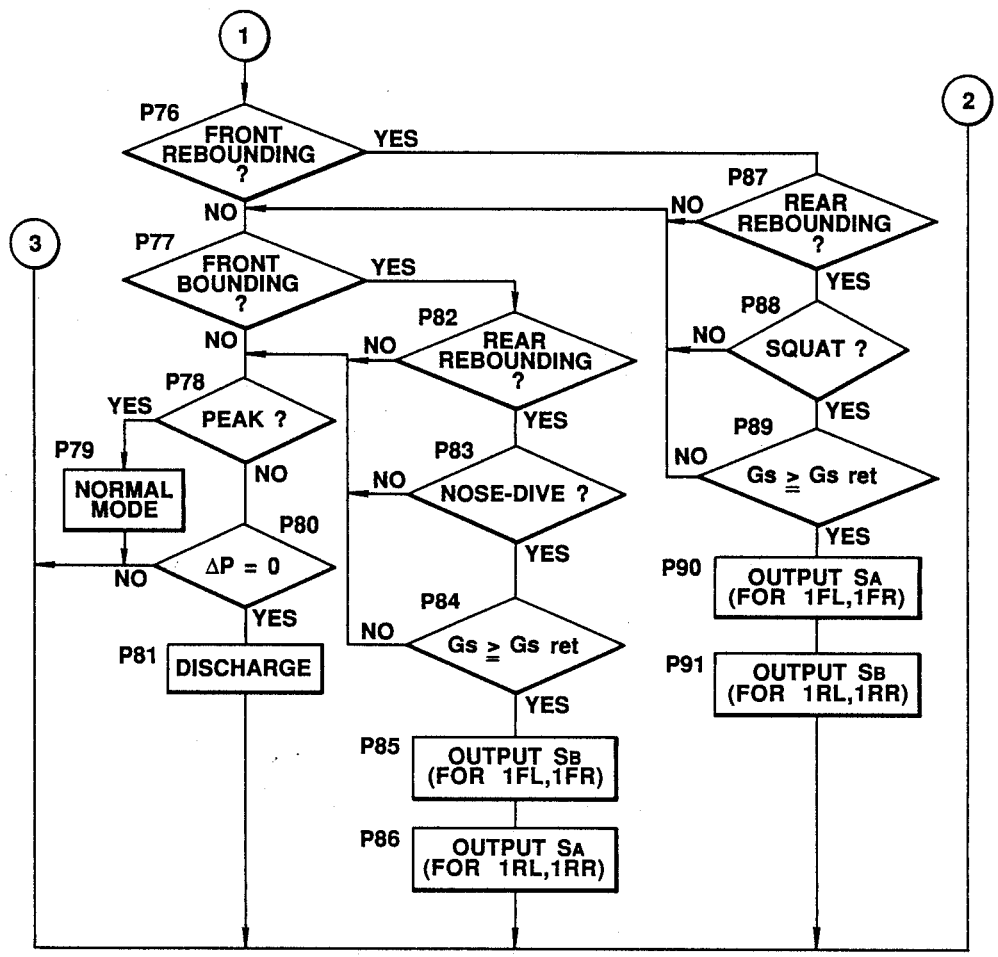

The practical process for performing suspension control will be discussed herebelow with reference to FIGS. 14(A) and 14(B).

Immediately after starting execution, the charge applied to the piezoelectric elements 60 and 90 of respective shock absorbers 1FL, 1FR, 1RL and 1RR are discharged. Then, the compression mode pressure indicative signal Sp and the expansion mode pressure indicative signal Ss are converted from analog signal into digital data and read out, at a step P61. Based on the read pressure indicative signal Sp and Ss, the variation rate $\Delta P$ thereof is derived at a step P62. Based on the variation rate $\Delta P$ is checked whether it is within the deadband at a step P63. When the variation rate $\Delta P$ is within the deadband as checked at the step P63, process goes END and returns to the background job. On the other hand, when the variation rate $\Delta P$ is out of the deadband as checked at the step P63, check is performed whether the pistons 4 in the right-front and the right-rear shock absorbers 1FR and 1RR are in rebounding stroke, at a step P64. If the answer at the step P64 is negative, check is performed whether the pistons 4 in the front-right and the rear-right shock absorbers 1FR and 1RR are both in bounding stroke at a step P65.

When the answer at the step P65 is positive, check is performed whether the pistons 4 in the front-left and the rear-left shock absorbers 1FL and 1RL are both in rebounding stroke at a step P66. Then, the vertical acceleration indicative signals $Gs_{FL}$, $Gs_{FR}$, $Gs_{RL}$ and $Gs_{RR}$ are checked if the porality of the front-right and the rear-right vertical acceleration indicative signal values $Gs_{FR}$ and $Gs_{RR}$ are positive and the polarity of the front-left and the rear-left vertical acceleration indicative signal values $Gs_{FL}$ and $Gs_{RL}$ are negative, at a step P67. When the answer at the step P67 is positive, absolute values of respective vertical acceleration indicative signals Gs is compared with a predetermined vertical acceleration threshold $Gs_{ref}$ at a step P68. As will be appreciated herefrom, when the answers at the steps P65, P66 and P67 are positive, judgement can be made that rolling in right-hand direction is occurring. Furthermore, through the result of the step P68, speed of rolling is discriminated whether the rolling requires suppression by suspension control or not. When the absolute values of all vertical acceleration indicative signals Gs are greater than or equal to the vertical acceleration threshold $Gs_{ref}$ as checked at the step P68, then the compression mode control signal $S_B$ is applied to piezoelectric element 90 of the front-right and the rear-right shock absorbers 1FR and 1RR to harden the damping characteristics thereof, at a step P69. Then, the expansion mode control signal $S_A$ is fed to the piezoelectric elements 60 of the front-left and the rear-left shock absorbers 1FL and 1RL for hardening damping characteristics thereof, at a step P70.

When the pistons 4 of the front-right and the rear-right shock absorbers 1FR and 1RR are in rebounding stroke as checked at the step P64, check is performed whether the pistons 4 of the front-left and the rear-left shock absorbers 1FL and 1RL are in bounding direction at a step P71. When the answer at the step P71 is positive, the vertical acceleration indicative signals $Gs_{FL}$, $Gs_{FR}$, $Gs_{RL}$ and $Gs_{RR}$ are checked if the porality of the front-left and the rear-left vertical acceleration indicative signal values $Gs_{FL}$ and $Gs_{RL}$ are positive and the polarity of the front-right and the rear-right vertical acceleration indicative signal values $Gs_{FR}$ and $Gs_{RR}$ are negative, at a step P72. When the answer at the step P72 is positive, absolute values of respective vertical acceleration indicative signals Gs is compared with a predetermined vertical acceleration threshold $Gs_{ref}$ at a step P73. As will be appreciated herefrom, when the answers at the steps P71, P72 and P73 are positive, judgement can be made that rolling in left-hand direction is occurring. Furthermore, through the result of the step P73, speed of rolling is discriminated whether the rolling requires suppression by suspension control or not. When the absolute values of all vertical acceleration indicative signals Gs are greater than or equal to the vertical acceleration threshold $Gs_{ref}$ as checked at the step P73, then the compression mode control signal $S_A$ is applied to piezoelectric element 60 of the front-right and the rear-right shock absorbers 1FR and 1RR to harden the damping characteristics thereof, at a step P74. Then, the expansion mode control signal $S_B$ is fed to the piezoelectric elements 90 of the front-left and the rear-left shock absorbers 1FL and 1RL for hardening damping characteristics thereof, at a step P75.

If both of pistons 4 of the front-right and the rear-right shock absorbers are not in bounding stroke as checked at the step P65, check is performed whether both of the pistons 4 of the front-left and the front-right shock absorbers 1FL and 1FR are in rebounding stroke, at a step P76. When the answer at the step P76 is negative, check is performed whether the front-left and the front-right shock absorbers 1FL and 1FR are in bounding stroke at a step P77. When the answer at the step P77 is negative, the normal mode suspension control of FIGS. 7 or 9 is triggered at a step P78.

On the other hand, when the pistons 4 of the front-left and the front-right shock absorbers 1FL and 1FR are both in bounding stroke as checked at the step P77, check is performed whether the pistons 4 of the rear-left and rear-right shock absorbers 1RL and 1RR are in rebounding stroke at a step P82. If the answer at the step P82 is positive, check is performed whether polarity of both of the front-left and front-right vertical acceleration indicative signals $Gs_{FL}$ and $Gs_{FR}$ are negative and polarity of both of the rear-left and rear-right vertical acceleration indicative signals $Gs_{RL}$ and $Gs_{RR}$ are positive, at a step P83. When the answer at the step P83 is positive, it means that nose dive is occurring in the vehicle body. Then, check is performed whether the absolute value of all of the vertical acceleration indicative signal values Gs is greater than or equal to the predetermined vertical acceleration threshold $Gs_{ref}$ at a step P84. If the answer is positive, process goes to the compression mode control signals $S_B$ are output to the piezoelectric elements 90 of the front-left and the front-right shock absorbers 1FL and 1FR for hardening the damping characteristics thereof at a step P85. Then, the expansion mode control signals $S_A$ are output to the piezoelectric elements 60 of the rear-left and the rear-right shock absorbers 1RL and 1RR for hardening the damping characteristics at a step P86.

If answer in one of the steps P82, P83 and P84 is negative, process goes to the step P78 to trigger normal mode suspension control.

On the other hand, when the answer at the step P76 is positive, check is performed whether the pistons 4 of the rear-left and the rear-right shock absorbers 1RL and 1RR are both in bounding stroke at a step P87. If the answer at the step P87 is positive, check is performed whether polarity of both of the front-left and front-right vertical acceleration indicative signals $Gs_{FL}$ and $Gs_{FR}$ are positive and polarity of both of the rear-left and rear-right vertical acceleration indicative signals $Gs_{FL}$ and $Gs_{RR}$ are negative, at a step P88. When the answer at the step P88 is positive, it means that squat is occurring in the vehicle body. Then, check is performed whether the absolute value of all of the vertical acceleration indicative signal values Gs is greater than or equal to the predetermined vertical acceleration threshold $Gs_{ref}$ at a step P89. If the answer is positive, process goes to the compression mode control signals $S_A$ are output to the piezoelectric elements 60 of the front-left and the front-right shock absorbers 1FL and 1FR for hardening the damping characteristics thereof at a step P90. Then, the expansion mode control signals $S_B$ are output to the piezoelectric elements 90 of the rear-left and the rear-right shock absorbers 1RL and 1RR for hardening the damping characteristics at a step P91.

If the answer at any one of the steps P87, P88 and P89 is negative, the normal mode suspension control is triggered at the step P78.

As can be appreciated herefrom, the shown embodiment performs both of anti-rolling and anti-pitching suspension control with utilizing vertical acceleration as parameter representing vehicular attitude change.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An automotive suspension system comprising:
    a shock absorber disposed between a vehicle body and a suspension member rotatably supporting a road wheel, said shock absorber including a cylinder tube connected to one of said vehicle body and said suspension member and defining an internal space, a piston disposed within said internal space for dividing said internal space into first and second chambers and connected to the other of said vehicle body and said suspension member for relative movement with respect to said cylinder tube, said first and second chambers being filled with a working fluid;
    a fluid communication means for establishing fluid communication between said first and second chambers with a limited fluid flow rate for generating a damping force against relative motion between said piston and said cylinder tube;
    a valve means associated with said fluid communication means for controlling flow restriction of said fluid communication means, said valve means being variable of flow restriction characteristics for varying damping characteristics of said shock absorber;
    a first sensor means for monitoring fluid pressure in said first chamber for producing a piston stroke indicative signal indicative of magnitude of piston stroke;
    a second sensor means for monitoring a vehicular body attitude change for producing a vehicular attitude change indicative signal having a signal representative of vehicular attitude change;
    an actuating means, associated with said valve means and responsive to a control signal, for controlling said valve means for adjusting flow restriction characteristics according said said control signal; and
    a controlling means, receiving said piston stroke indicative signal, for controlling said actuating means for controlling damping characteristics depending upon the vehicle driving condition, said controlling means operating in a first operational mode while said vehicular attitude change indicative signal value is smaller than a predetermined attitude change criterion and a second mode while said attitude change indicative signal value is greater than or equal to said attitude change criterion, said controlling means, operating in said first operational mode, outputting said control signal alternating damping characteristics at least between a first harder damping characteristics and a second softer damping characteristics in depending upon piston stroke direction in each vibration cycle, and operating in said second operational mode, outputting control signal for suppressing attitude change irrespective of piston stroke direction.

2. A suspension system as set forth in claim 1, wherein said controlling means operates in said first operational mode for deriving a piston motion representative data on the basis of said piston stroke indicative signal, comparing said piston motion representative data with a predetermined deadband criteria which are set with respect to a neutral value and defining a predetermined deadband, and detecting said piston motion representative data out of said deadband and reaching a peak value for producing said control signal for harder damping characteristics and detecting said piston motion representative data varying across said neutral value for producing said control signal for softer damping characteristics.

3. A suspension system as set forth in claim 1, wherein said controlling means operates in said second operational mode for outputting said control signal for hardening damping characteristic in piston stroke direction.

4. A suspension system as set forth in claim 3, wherein said controlling means, operating in said second operational mode, is responsive to piston stroke in bounding direction to output said control signal ordering harder damping characteristics against piston bounding stroke.

5. A suspension system as set forth in claim 4, wherein said controlling means, operating in said second operational mode, is responsive to piston stroke in rebounding direction to output said control signal ordering harder damping characteristics against piston rebounding stroke.

6. A suspension control system as set forth in claim 1, wherein said second sensor monitors a vehicle driving parameter which is associated with vehicular attitude, said controlling means detects vehicle driving condition having possibility of causing vehicular attitude change on the basis of said vehicular attitude change indicative signal and detects actual occurrence of vehicular attitude change based on said piston stroke indicative signal under the presence of said vehicular attitude change indicative signal representing said vehicle driving condition having possibility of causing vehicle attitude change.

7. An automotive suspension system comprising:
a first shock absorber disposed between a vehicle body and a first suspension member rotatably supporting a road wheel, said first shock absorber including a cylinder tube connected to one of said vehicle body and said first suspension member and defining an internal space, a piston disposed within said internal space for dividing said internal space into first and second chambers and connected to the other of said vehicle body and said first suspension member for relative movement with respect to said cylinder tube, said first and second chambers being filled with a working fluid;
a second shock absorber disposed between a vehicle body and a second suspension member rotatably supporting a road wheel and oriented at different position to said first suspension member, said second shock absorber including a cylinder tube connected to one of said vehicle body and said second suspension member and defining an internal space, a piston disposed within said internal space for dividing said internal space into first and second chambers and connected to the other of said vehicle body and said second suspension member for relative movement with respect to said cylinder tube, said first and second chambers being filled with a working fluid;
a fluid communication means for establishing fluid communication between said first and second chambers with a limited fluid flow rate for generating a damping force against relative motion between said piston and said cylinder tubes of said first and second shock absorbers;
first and second valve means respectively associated with said fluid communication means for controlling flow restriction of said fluid communication means, said valve means being variable of flow restriction characteristics for varying damping characteristics of said first and shock absorbers independently of each other;
a first piston stroke sensor means for monitoring fluid pressure in said first chamber of said first shock absorber for producing a first piston stroke indicative signal indicative of magnitude of piston stroke;
a second piston stroke sensor means for monitoring fluid pressure in said first chamber of said second shock absorber for producing a second piston stroke indicative signal indicative of magnitude of piston stroke;
a vehicular attitude sensor means for monitoring a vehicular body attitude change for producing a vehicular attitude change indicative signal having a signal representative of vehicular attitude change;
first and second actuating means, respectively associated with said first and second valve means and responsive to first and second control signal, for controlling associated first and second valve means for adjusting flow restriction characteristics according said first and second control signal; and
a controlling means, receiving said first and second piston stroke indicative signals, for controlling said actuating means for controlling damping characteristics of said first and second shock absorbers depending upon the vehicle driving condition, said controlling means operating in a first operational mode while said vehicular attitude change indicative signal value is smaller than a predetermined attitude change criterion and a second mode while said attitude change indicative signal value is greater than or equal to said attitude change criterion, said controlling means, operating in said first operational mode, outputting said control signal alternating damping characteristics of said first and second shock absorbers at least between a first harder damping characteristics and a second softer damping characteristics in depending upon piston stroke direction in each vibration cycle, and operating in said second operational mode, outputting said first and second control signal for suppressing attitude change irrespective of piston stroke direction.

8. A suspension system as set forth in claim 7, wherein said controlling means operates for controlling damping characteristics of each of said first and second shock absorber in said first operational mode by deriving a piston motion representative data on the basis of said piston stroke indicative signal, comparing said piston motion representative data with a predetermined deadband criteria which are set with respect to a neutral value and defining a predetermined deadband, and detecting said piston motion representative data out of said deadband and reaching a peak value for producing said control signal for harder damping characteristics and detecting said piston motion representative data varying across said neutral value for producing said control signal for softer damping characteristics.

9. A suspension system as set forth in claim 7, wherein said controlling means operates in said second operational mode for outputting said first and second control signal for hardening damping characteristic of said first and second shock absorbers, said controlling means selectively providing harder damping characteristics for respective of said first and second shock absorbers in piston stroke direction.

10. A suspension system as set forth in claim 9, wherein said controlling means, operating in said second operational mode, is responsive to piston stroke in bounding direction to output said control signal ordering harder damping characteristics against piston bounding stroke.

11. A suspension system as set forth in claim 10, wherein said controlling means, operating in said second operational mode, is responsive to piston stroke in rebounding direction to output said control signal ordering harder damping characteristics against piston rebounding stroke.

12. A suspension control system as set forth in claim 7, wherein said vehicular attitude sensor monitors a vehicle driving parameter which is associated with vehicular attitude, said controlling means detects vehicle driving condition having possibility of causing vehicular attitude change on the basis of said vehicular attitude change indicative signal and detects actual occurrence of vehicular attitude change based on said piston stroke indicative signal under the presence of said vehicular attitude change indicative signal representing said vehicle driving condition having possibility of causing vehicle attitude change.

13. An anti-rolling suspension system comprising:
a first shock absorber disposed between a vehicle body and a first suspension member rotatably supporting a road wheel, said first shock absorber including a cylinder tube connected to one of said vehicle body and said first suspension member and defining an internal space, a piston disposed within said internal space for dividing said internal space into first and second chambers and connected to the other of said vehicle body and said first suspension member for relative movement with respect to said cylinder tube, said first and second chambers being filled with a working fluid;
a second shock absorber disposed between a vehicle body and a second suspension member rotatably supporting a road wheel and oriented at lateral opposite side of vehicle body relative to said first suspension member, said second shock absorber including a cylinder tube connected to one of said vehicle body and said second suspension member and defining an internal space, a piston disposed within said internal space for dividing said internal space into first and second chambers and connected to the other of said vehicle body and said second suspension member for relative movement with respect to said cylinder tube, said first and second chambers being filled with a working fluid;
first and second fluid communication means, disposed within respective of said first and second shock absorbers, for establishing fluid communication between said first and second chambers of respective first and second shock absorbers with a limited fluid flow rate for generating damping force against relative motion between said piston and said cylinder tubes of said first and second shock absorbers;
first and second means respectively associated with said fluid communication means of said first and second shock absorber for controlling flow restriction of said fluid communication means, said valve means being variable of flow restriction characteristics for varying damping characteristics of said first and shock absorbers independently of each other, said first and second means being responsive to fluid pressure in said first chamber and second chambers of respectively associated said first and second shock absorbers for producing a first and second piston stroke indicative signals, each indicative of magnitude of piston stroke;
a vehicular attitude sensor means for monitoring a vehicular body attitude change for producing a vehicular attitude change indicative signal having a signal representative of vehicular attitude change;
a controlling means, receiving said first and second piston stroke indicative signals and said attitude change indicative signal, for controlling said first and second means in order to control damping characteristics of said first and second shock absorbers depending upon the vehicle driving condition, said controlling means being responsive to said vehicular rolling for outputting said first and second control signal for increasing flow restriction of said one of said first and second means in order to harden damping characteristics against piston bounding stroke for one of said first and second shock absorbers acting in bounding stroke, and for increasing flow restriction of the other one of said first and second means in order to harden damping characteristics against piston rebounding stroke for the other of said first and second shock absorbers acting in rebounding stroke.

14. A suspension system as set forth in claim 13, wherein said controlling means operates for controlling damping characteristics of each of said first and second shock absorber y deriving a piston motion representative data on the basis of said piston stroke indicative signal, comparing said piston motion representative data with a predetermined deadband criteria which are set with respect to a neutral value and defining a predetermined deadband, and detecting said piston motion representative data out of said deadband and reaching a peak value for producing said control signal for harder damping characteristics and detecting said piston motion representative data varying across said neutral value for producing said control signal for softer damping characteristics, which said attitude change indicative signal representing vehicular driving condition to cause vehicular rolling is absent.

15. A suspension control system as set forth in claim 14, wherein said vehicular attitude sensor monitors a vehicle driving parameter which is associated with vehicular attitude, said controlling means detects vehicle driving condition having possibility of causing vehicular attitude change on the basis of said vehicular attitude change indicative signal and detects actual occurrence of vehicular attitude change based on said piston stroke indicative signal under the presence of said vehicular attitude change indicative signal representing said vehicle driving condition having possibility of causing vehicle attitude change.

16. A suspension control system as set forth in claim 15, wherein said vehicular attitude sensor means comprises a steering angle sensor.

17. A suspension control system as set forth in claim 15, wherein said vehicular attitude change sensor means comprises a lateral acceleration sensor.

18. An anti-pitching suspension system comprising:
a first shock absorber disposed between a vehicle body and a first suspension member rotatably supporting a road wheel, said first shock absorber including a cylinder tube connected to one of said vehicle body and said first suspension member and defining an internal space, a piston disposed within said internal space for dividing said internal space into first and second chambers and connected to the other of said vehicle body and said first suspension member for relative movement with respect to said cylinder tube, said first and second chambers being filled with a working fluid;
a second shock absorber disposed between a vehicle body and a second suspension member rotatably supporting a road wheel and oriented at longitudinal opposite side of vehicle body relative to said first suspension member, said second shock absorber including a cylinder tube connected to one of said vehicle body and said second suspension member and defining an internal space, a piston disposed within said internal space for dividing said internal space into first and second chambers and connected to the other of said vehicle body and said second suspension member for relative movement with respect to said cylinder tube, said first and second chambers being filled with a working fluid;

first and second fluid communication means, disposed within respective of said first and second shock absorbers, for establishing fluid communication between said first and second chambers of respective first and second shock absorbers with a limited fluid flow rate for generating damping force against relative motion between said piston and said cylinder tubes of said first and second shock absorbers;

first and second means respectively associated with said fluid communication means of said first and second shock absorber for controlling flow restriction of said fluid communication means, said valve means being variable of flow restriction characteristics for varying damping characteristics of said first and shock absorbers independently of each other, said first and second means being responsive to fluid pressure in said first chamber and second chambers of respectively associated said first and second shock absorbers for producing a first and second piston stroke indicative signals, each indicative of magnitude of piston stroke;

a vehicular attitude sensor means for monitoring a vehicular body attitude change for producing a vehicular attitude change indicative signal having a signal representative of vehicular attitude change;

a controlling means, receiving said first and second piston stroke indicative signals and said attitude change indicative signal, for controlling said first and second means in order to control damping characteristics of said first and second shock absorbers depending upon the vehicle driving condition, said controlling means being responsive to said vehicular pitching for outputting said first and second control signal for increasing flow restriction of said one of said first and second means in order to harden damping characteristics against piston bounding stroke for one of said first and second shock absorbers acting in bounding stroke, and for increasing flow restriction of the other one of said first and second means in order to harden damping characteristics against piston rebounding stroke for the other of said first and second shock absorbers acting in rebounding stroke.

19. A suspension system as set forth in claim 18, wherein said controlling means operates for controlling damping characteristics of each of said first and second shock absorber deriving a piston motion representative data on the basis of said piston stroke indicative signal, comparing said piston motion representative data with a predetermined deadband criteria which are set with respect to a neutral value and defining a predetermined deadband, and detecting said piston motion representative data out of said deadband and reaching a peak value for producing said control signal for harder damping characteristics and detecting said piston motion representative data varying across said neutral value for producing said control signal for softer damping characteristics, which said attitude change indicative signal representing vehicular driving condition to cause vehicular pitching is absent.

20. A suspension control system as set forth in claim 19, wherein said vehicular attitude sensor monitors a vehicle driving parameter which is associated with vehicular attitude, said controlling means detects vehicle driving condition having possibility of causing vehicular attitude change on the basis of said vehicular attitude change indicative signal and detects actual occurrence of vehicular attitude change based on said piston stroke indicative signal under the presence of said vehicular attitude change indicative signal representing said vehicle driving condition having possibility of causing vehicle attitude change.

21. A suspension control system as set forth in claim 20, wherein said vehicular attitude sensor means comprises a steering angle sensor.

22. A suspension control system as set forth in claim 20, wherein said vehicular attitude change sensor means comprises a lateral acceleration sensor.

23. A hydraulic shock absorber comprising:

a cylinder tube disposed between a vehicle body and a suspension member rotatably supporting a road wheel;

a piston disposed within an internal space of said cylinder tube for dividing said internal space into first and second chambers, said first and second chambers being filled with a working fluid;

a fluid communication means, disposed within respective of said shock absorber, for establishing fluid communication between said first and second chambers with a limited fluid flow rate for generating damping force against relative motion between said piston and said cylinder tube;

means, associated with said fluid communication means for controlling flow restriction of said fluid communication means, said flow restriction controlling means being variable of flow restriction characteristics for varying damping characteristics of said shock absorber, said flow restriction controlling means being responsive to fluid pressure in said first chamber and second chambers for producing a piston stroke indicative signal, each indicative of piston stroke activity, said flow restriction controlling means being responsive to road shock for alternating flow restriction between first greater value and second smaller value during each of vibration cycle, and being responsive to vehicular attitude change to set said first greater value of flow restriction at least in piston bounding stroke so as to harden damping characteristics against piston bounding stroke motion.

24. A shock absorber as set forth in claim 23, wherein said flow restriction controlling means is responsive to rebounding direction of piston stroke in vehicular attitude change for setting said flow restriction at said first value in the piston rebounding direction in order to harden damping characteristics against piston rebounding stroke motion.

* * * * *